United States Patent
Clarke et al.

(10) Patent No.: US 10,087,823 B2
(45) Date of Patent: *Oct. 2, 2018

(54) SYNERGISTIC INDUCTION AND TURBOCHARGING IN INTERNAL COMBUSTION ENGINE SYSTEMS

(71) Applicant: Bright Acceleration Technologies LLC, Sheboygan Falls, WI (US)

(72) Inventors: James R. Clarke, Levering, MI (US); Richard J. Fotsch, Sheboygan Falls, WI (US); C. Thomas Sylke, Whitefish Bay, WI (US)

(73) Assignee: Bright Acceleration Technologies LLC, Sheboygan Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,708

(22) Filed: Mar. 23, 2017

(65) Prior Publication Data

US 2018/0058307 A1    Mar. 1, 2018

Related U.S. Application Data

(63) Continuation of application No. 15/254,138, filed on Sep. 1, 2016, now Pat. No. 9,638,095.

(51) Int. Cl.
*F02B 37/00* (2006.01)
*F02B 37/007* (2006.01)
(Continued)

(52) U.S. Cl.
CPC ............ *F02B 37/007* (2013.01); *F02B 37/22* (2013.01); *F02D 9/1095* (2013.01)

(58) Field of Classification Search
CPC .. F02B 2075/027; F02B 33/34; F02B 37/001; F02B 37/007; F02B 75/22; F02B 75/02;
(Continued)

(56) References Cited

U.S. PATENT DOCUMENTS

| | | | |
|---|---|---|---|
| 2,583,430 A | | 1/1952 | Kadency |
| 3,232,042 A | * | 2/1966 | Sarra .................... F02B 29/0437 123/563 |

(Continued)

OTHER PUBLICATIONS

Ulrich, Lawrence. "Carmakers Find That Turbos Are a Powerful Path to Fuel Efficiency". The New York Times company. Feb. 26, 2015.
(Continued)

*Primary Examiner* — Jason Newton
(74) *Attorney, Agent, or Firm* — C. Thomas Sylke

(57) ABSTRACT

Synergistic induction and turbocharging includes the use of one or more throttles in close proximity to each cylinder intake valve to control air flow in each intake port delivering air to combustion cylinders in an internal combustion engine system. A turbocharger may also be affixed in close proximity to each cylinder exhaust valve to enable a synergistic combination of hyper-filling cylinders with combustion air and immediate harvesting of exhaust gas by adjacent turbochargers. In some implementations the turbochargers may be low-inertia turbochargers. The combination of individual throttles per intake port and a turbocharger in close proximity to each cylinder enables faster ramp-up of an engine in the early stages of acceleration. Various implementations thus provide improved fuel economy and improved engine performance in tandem, instead of one at the expense of the other.

22 Claims, 14 Drawing Sheets

(51) Int. Cl.
*F02D 9/10* (2006.01)
*F02B 37/22* (2006.01)

(58) Field of Classification Search
CPC .... F02B 75/18; F02D 9/02; F02D 2009/0279;
F02M 25/0711
USPC .................. 123/562, 184.26, 184.36, 184.59;
60/612, 602
See application file for complete search history.

(56) References Cited

U.S. PATENT DOCUMENTS

| | | | |
|---|---|---|---|
| 3,824,971 A | | 7/1974 | Skatsche et al. |
| 4,125,015 A | | 11/1978 | Di Nunzio et al. |
| 4,228,655 A | | 10/1980 | Herschmann et al. |
| 4,400,944 A | | 8/1983 | Iwamoto et al. |
| 4,427,087 A | | 1/1984 | Inoue et al. |
| 4,432,205 A | | 2/1984 | Inoue et al. |
| 4,502,435 A | | 3/1985 | Tadokoro et al. |
| 4,630,446 A | | 12/1986 | Iwai et al. |
| 4,860,709 A | | 8/1989 | Clarke et al. |
| 4,993,227 A | | 2/1991 | Nagura et al. |
| 5,467,748 A | * | 11/1995 | Stockhausen ........... F02D 13/06 123/198 F |
| 5,488,827 A | | 2/1996 | Helmich et al. |
| 5,642,698 A | | 7/1997 | Diehl et al. |
| 5,649,512 A | | 7/1997 | Flanery, Jr. et al. |
| 5,653,202 A | | 8/1997 | Ma |
| 5,775,283 A | * | 7/1998 | Sawai ..................... F02B 27/02 123/184.53 |
| 5,852,994 A | | 12/1998 | Tsuzuku et al. |
| 5,884,478 A | | 3/1999 | Edmonds, Jr. |
| 5,957,096 A | * | 9/1999 | Clarke ..................... F01L 1/26 123/305 |
| 6,170,443 B1 | | 1/2001 | Hofbauer |
| 6,279,320 B1 | | 8/2001 | Mailander |
| 6,324,847 B1 | | 12/2001 | Pierpont |
| 6,550,247 B1 | | 4/2003 | Gladden et al. |
| 6,925,971 B1 | | 8/2005 | Peng et al. |
| 6,957,632 B1 | | 10/2005 | Carlson et al. |
| 7,302,929 B2 | | 12/2007 | Kondo |
| 7,712,311 B2 | | 5/2010 | Ren et al. |
| 7,886,530 B2 | | 2/2011 | Winsor et al. |
| 7,921,648 B2 | | 4/2011 | Eitel et al. |
| 7,937,941 B2 | | 5/2011 | Nau et al. |
| 8,151,567 B2 | | 4/2012 | Rollinger et al. |
| 8,176,735 B2 | | 5/2012 | Komatsu |
| 8,210,136 B2 | | 7/2012 | Howard |
| 8,256,213 B2 | | 9/2012 | Kuhlbach et al. |
| 8,266,906 B2 | | 9/2012 | Wu et al. |
| 8,316,639 B2 | | 11/2012 | Takahashi et al. |
| 8,333,071 B2 | | 12/2012 | Oakley et al. |
| 8,336,309 B2 | | 12/2012 | McEwan et al. |
| 8,359,859 B2 | | 1/2013 | Shiraishi |
| 8,371,266 B1 | | 2/2013 | Ulrey et al. |
| 8,442,743 B2 | | 5/2013 | Massard et al. |
| 8,499,726 B2 | | 8/2013 | Cox |
| 8,499,747 B2 | | 8/2013 | Schmalzl |
| 8,544,268 B2 | | 10/2013 | Begin |
| 8,567,191 B2 | | 10/2013 | Geyer |
| 8,572,961 B2 | | 11/2013 | Karnik et al. |
| 8,596,252 B2 | | 12/2013 | Liu et al. |
| 8,683,799 B2 | | 4/2014 | Azuma |
| 8,713,937 B2 | | 5/2014 | Pursifull et al. |
| 8,733,088 B2 | | 5/2014 | Reinhart et al. |
| 8,747,788 B1 | | 6/2014 | Baig et al. |
| 8,783,029 B2 | | 7/2014 | Vigild et al. |
| 8,793,999 B2 | | 8/2014 | Rebhan et al. |
| 8,806,869 B2 | | 8/2014 | Petrovic |
| 8,813,494 B2 | | 8/2014 | Hofer et al. |
| 8,820,071 B2 | | 9/2014 | Tkac |
| 8,844,282 B2 | 9/2014 | Jaegle et al. |
| 8,863,514 B2 | 10/2014 | Joergl et al. |
| 8,881,522 B2 | 11/2014 | Jebasinski et al. |
| 8,915,081 B2 | 12/2014 | Hayman et al. |
| 8,955,485 B2 | 2/2015 | Kulkarni |
| 8,984,878 B2 | 3/2015 | Grosch et al. |
| 8,991,177 B2 | 3/2015 | Rutschmann et al. |
| 8,997,487 B2 | 4/2015 | Drangel et al. |
| 9,002,619 B2 | 4/2015 | Ito et al. |
| 9,021,806 B2 | 5/2015 | Kuhlbach et al. |
| 9,027,539 B2 | 5/2015 | Miyashita |
| 9,145,858 B2 | 9/2015 | Maceroni et al. |
| 9,447,754 B1 | 9/2016 | Clarke et al. |
| 2002/0124566 A1 | 9/2002 | Kapich |
| 2004/0020205 A1 | 2/2004 | Mailander |
| 2005/0169764 A1 | 8/2005 | Geoffrey Heyes et al. |
| 2006/0021347 A1 | 2/2006 | Sun et al. |
| 2009/0038309 A1 | 2/2009 | Cocca et al. |
| 2010/0122530 A1 | 5/2010 | French |
| 2012/0090320 A1 | 4/2012 | Kuhlbach et al. |
| 2012/0279215 A1 | 11/2012 | Roth et al. |
| 2013/0167527 A1 | 7/2013 | Cattani et al. |
| 2013/0233289 A1 | 9/2013 | Mailander |
| 2014/0150423 A1 | 6/2014 | Heyes |
| 2014/0260239 A1 | 9/2014 | Genter |
| 2015/0121862 A1 | 5/2015 | Wade et al. |
| 2015/0159660 A1 | 6/2015 | Kares et al. |
| 2015/0192078 A1 | 7/2015 | Martin et al. |
| 2016/0090951 A1 | 3/2016 | Kim et al. |

OTHER PUBLICATIONS

Borgwarner Turbo Systems; Design and Function of a Turbocharger: Turbine; downloaded from www.turbos.bwauto.com on May 31, 2015.
Kane, Jack; Exhaust System Technology—The Sound and The Fury; EPI Inc.; downloaded from www.epi-eng.com on May 31, 2015; modified version of an article appearing in Race Engine Technology magazine; Issue 036; Feb. 2009.
Internet Archive. Website crawl record [online]. Internet Archive Wayback Machine [retrieved on Jan. 13, 2016]. Retrieved from the internet: <URL: https://web.archive.org/web/20121227140611/http://www.hotrodsandcoolstuff.com/enginebuild.html>.
Internet Archive. Website crawl record [online]. Internet Archive Wayback Machine [retrieved on Jan. 13, 2016]. Retrieved from the internet: <URL: https://web.archive.org/web/20060316150840/http://www.gizmag.com/go/5227/>.
Invitation to Pay Additional Fees and, Where Applicable, Protest Fee, International Application No. PCT/US2016/40362 (3 pages).
Garrett, "Turborcharger Specs," Mar. 28, 2011. Retrieved from the Internet on Sep. 6, 2016. URL: <http://turbochargerspecs.blogspot.com/2011_03_01_archive.html>.
Wiseco Piston Sets for 1.8L Mazda Miata (5XRACING) Jun. 11, 2015. Retrieved from the Internet on Sep. 6, 2016. URL: <https://web.archive.org/web/20150611041034/http:/15xracing.com/i-11988983-wiseco-piston-s ets-for-1-8l-mazda-miata.html>.
Notification of Transmittal of the International Search Report and The Written Opinion of the International Searching Authority, International Application No. PCT/US2016/040362, dated Dec. 19, 2016 (1 page).
International Search Report, International Application No. PCT/US2016/040362, dated Dec. 19, 2016 (6 pages).
Written Opinion of the International Searching Authority, International Application No. PCT/US2016/040362, dated Dec. 19, 2016 (20 pages).
Notification of Transmittal of The International Search Report and The Written Opinion of the International Searching Authority, or Declaration re International Application No. PCT/US17/49870 dated Jan. 26, 2018 (25 pages).

* cited by examiner

SYNERGISTIC INDUCTION AND TURBOCHARGING IN INTERNAL COMBUSTION ENGINE SYSTEMS

RELATED APPLICATIONS

This application is a continuation of U.S. patent application Ser. No. 15/254,138, filed on Sep. 1, 2016, entitled "SYNERGISTIC INDUCTION AND TURBOCHARGING IN INTERNAL COMBUSTION ENGINE SYSTEMS," which is incorporated herein by reference in its entirety for all purposes.

TECHNICAL FIELD

The disclosure relates to internal combustion engines and the use of turbochargers therewith.

TECHNICAL BACKGROUND

Changes in motor vehicle internal combustion engines to improve fuel economy and/or to reduce carbon emissions have led to "undersized engines"—the utilization of smaller engines in vehicles that are larger than those smaller engines were originally intended to serve. Efforts to reduce friction, to reduce pumping work and to address other challenges have yielded engines having fewer combustion cylinders and/or smaller displacements than predecessor engines. At low load, the throttle of a traditional engine is substantially closed, reducing engine cylinder pressure. In such a situation the engine has to work to draw combustion air into the cylinders, thus causing a pumping loss that reduces engine efficiency and lowers fuel economy. Friction reduction has been achieved by reducing the number of combustion cylinders in engines and/or reducing the engine's displacement, again resulting in reduced engine power.

Turbochargers have been employed to improve engine torque, but have introduced a performance problem for drivers; turbocharged engines have suffered from turbo lag during acceleration. These new configurations thus naturally result in both lower power and poorer performance at tip-in and slow speeds. In addition to the negative impacts on performance, fewer cylinders and/or smaller displacements mean reduced engine power more generally. New ways have been sought to generate additional power to compensate for these deficiencies. Some solutions have utilized twin-scroll, dual-nozzle and variable-geometry turbochargers, which add complexity to an engine's operation and layout.

Some earlier engine systems have replaced conventional throttle butterfly valves with intake-valve-controlled throttling that uses an electrical, electromechanical and/or hydraulic mechanism to control individual intake valve lift for each cylinder to regulate combustion air flow into the cylinder. These systems use a stepper motor to control a secondary eccentric shaft fitted with a series of intermediate rocker arms, which in turn control the degree of valve lift. The throttle butterfly valve is no longer used to control the cylinder's combustion air supply, though for safety reasons it is still fitted as an emergency back-up. Thus these earlier systems have additional hardware the increases the complexity of crankshaft operation. Moreover, because the intake valves are used as combustion air control valves, tremendous spring and frictional valve spring forces and operational characteristics must be addressed and overcome with an intake valve throttling operation. These heavy spring and frictional forces diminish the responsiveness of these intake-valve-as-throttle systems.

OVERVIEW

Synergistic induction and turbocharging includes the use of one or more throttles in close proximity to each cylinder intake valve to control air flow in each intake port delivering air to combustion cylinders in an internal combustion engine system. A turbocharger may also be affixed in close proximity to each cylinder exhaust valve to enable a synergistic combination of hyper-filling cylinders with combustion air and immediate harvesting of exhaust gas by adjacent turbochargers. In some implementations the turbochargers may be low-inertia turbochargers. The combination of individual throttles per intake port and a turbocharger in close proximity to each cylinder enables faster ramp-up of an engine in the early stages of acceleration. These implementations and others described herein provide concomitant improvements in both fuel economy and engine performance. Frequently, improvements to fuel economy have imposed performance limitations and, similarly, improved engine performance has come with fuel economy degradation. More specifically, synergistic induction and turbocharging further improves fuel economy because "real time" torque is greater under acceleration conditions and provides various benefits, including (without limitation): the use of lower numerical axle ratios, lower "K" factor torque converters, earlier (i.e., lower engine RPM) shift schedules, and more time and operating modes with fuel delivery held to a 14.6 to 1 air fuel ratio.

In internal combustion engine systems utilizing cylinders having only one intake port, a throttle is affixed in close proximity to any intake valve(s) to control air flow through the intake port. In some implementations a turbocharger is affixed in close proximity to each cylinder's exhaust valve(s). The combination in these implementations of one throttle per intake port and one turbocharger per cylinder provide rapid filling of the cylinder with combustion air when the engine ceases idle operation and provides substantial improvement in turbocharger performance, in some instances eliminating perceptible turbo lag. In some implementations a standard turbocharging system can be used, which still provides improved ramp-up of the turbocharger.

In internal combustion engine systems utilizing cylinders having two separate intake ports for each cylinder, a throttle is affixed in close proximity to each intake port's intake valve(s) to control air flow through each intake port. An individual turbocharger can be affixed in close proximity to each cylinder's exhaust valve, in some cases using low-inertia turbochargers to further enhance turbocharger ramp-up. The dual-port throttles in each cylinder's induction system can be operated in unison (i.e., so that all throttles are either open or closed) or can be operated in a bifurcated or other manner. In some implementations bifurcated operation of the throttles can include opening only one throttle per cylinder when idle mode operation of the engine system ceases and maintaining single port air flow until peak single-port torque is reached, after which the second throttle in each cylinder intake can be opened to permit air flow through both intake ports at higher loads.

Close proximity of a cylinder's throttle mechanism to that cylinder's intake valve system can be characterized by the throttle-to-intake volume defined in an intake channel between any throttle(s) and their respective intake valve(s). The throttle-to-intake volume can be limited to 80% or less of the cylinder displacement or to 60% or less of the cylinder displacement in some implementations. Moreover, close proximity of a turbocharger to its respective exhaust valve(s) can be characterized by the exhaust-to-turbine volume defined in an exhaust channel between any exhaust valve(s) and the turbocharger's turbine inlet.

In both single-port and dual-port implementations, equalizing ports can be used to provide generally even distribution of combustion air during idle mode operation of the engine system. These ports can be passages interconnecting and allowing air flow between intake valves of the combustion cylinders and may, in some implementations, include equalizing port valves to close the equalizing ports whenever the engine system is not operating in idle mode. Moreover, balancing valves can be used to allow sharing of exhaust gas between turbochargers. These balancing ports can be passages interconnecting and allowing exhaust gas flow between exhaust valves of the combustion cylinders and may, in some implementations, including balancing port valves to prevent exhaust gas sharing.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 7 FIG. 6A illustrates an internal combustion engine system.

DETAILED DESCRIPTION

Figure 1:
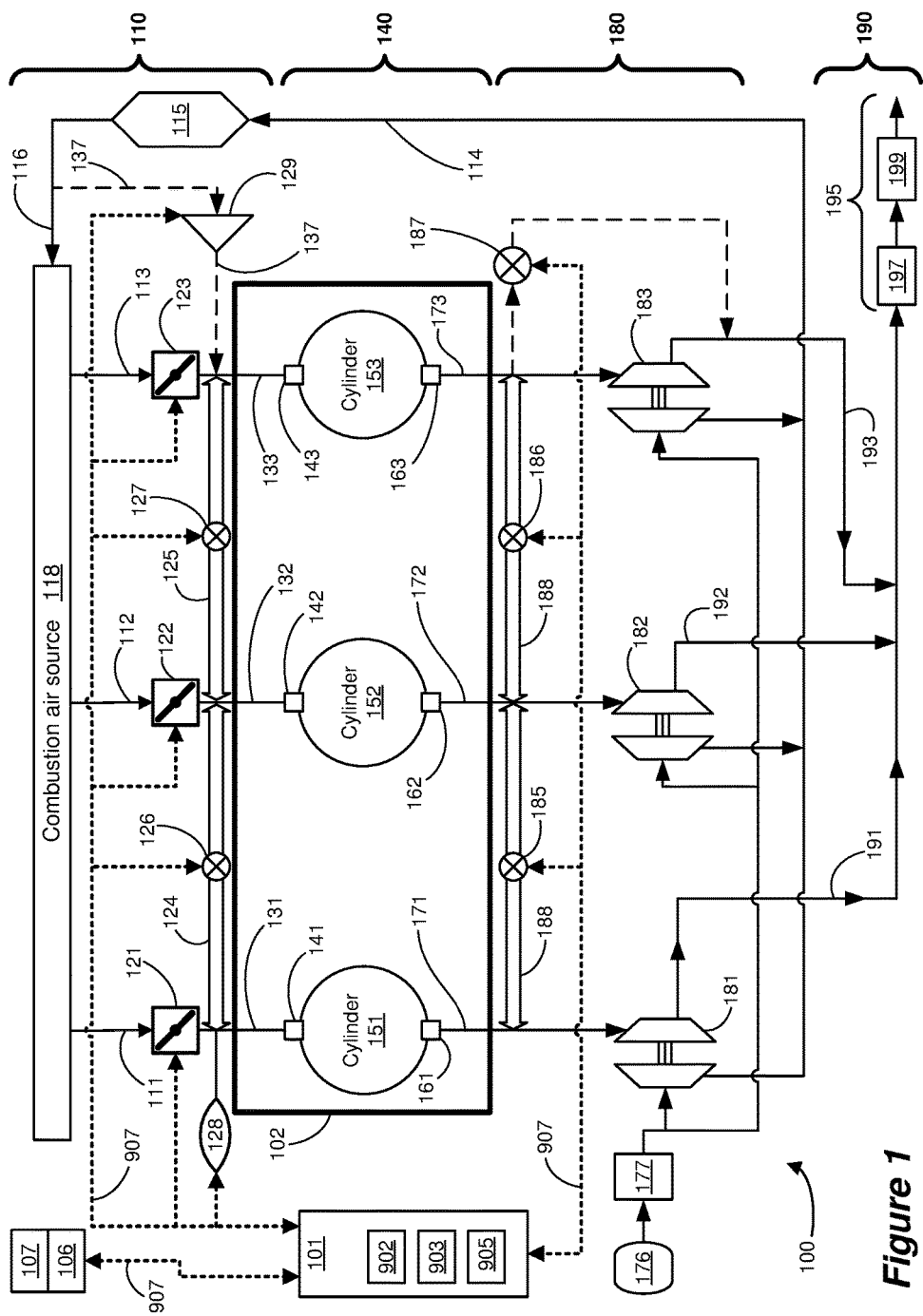
FIG. 1 illustrates an internal combustion engine system.

Implementations of synergistic induction and turbocharging in an internal combustion engine system can eliminate perceptible turbo lag through the interactive operation of induction and turbocharging systems. Synergistic induction and turbocharging includes implementations in which a throttle mechanism is operationally affixed in close proximity to each combustion cylinder's intake valve system that is supplied with combustion air by an intake port, for example by operationally mounting a throttle plate in an intake channel comprising an intake runner and/or intake port. Where each combustion cylinder in a given engine has multiple intake ports, each of which supplies combustion air to an intake valve system, an individual throttle can be mounted to regulate air flow through each individual intake port, the throttle affixed in close proximity to each intake port's intake valve system, thus resulting in multiple throttles per combustion cylinder in some implementations.

This type of induction system allows for combustion cylinder "hyper-filling" (that is, faster and higher charge density filling of each cylinder). When this hyper-filling induction system is combined with a turbocharging system, perceptible turbo lag in internal combustion engine systems can be eliminated because such hyper-filling can immediately ramp up a turbocharging system (including turbocharging systems comprising an individual turbocharger affixed in close proximity to each cylinder's exhaust valve(s)).

Some implementations further include an individual turbocharger having a turbine inlet affixed in close proximity to each combustion cylinder's exhaust port. As explained in more detail herein, an individual throttle per intake port and an individual turbocharger each affixed in close proximity to a single combustion cylinder provide substantially enhanced tip-in and ramp-up as compared to combustion cylinder configurations lacking one or both of the individual throttle and/or individual turbocharger per cylinder. In some implementations low-inertia turbochargers can be implemented to further enhance tip-in and ramp-up of the engine system.

Faster induction filling, in addition to producing faster and higher charge cylinder filling, likewise leads to faster and higher energy feeding of turbocharger turbine wheels, which synergistically produces more rapid acceleration of the turbine wheel and compressor wheel to further enhance increased charge density and acceleration of the turbine rotational speed and compressor wheel speed. Induction system fill time is reduced by operationally affixing an individual throttle to regulate air flow through each cylinder intake port in close proximity to the cylinder intake valve(s) associated with that intake port, thus decreasing the volume of air between the throttle plate and the intake valve. The volume to fill can be reduced by 90% when compared to an engine configuration in which an intake throttle is located at the intake manifold entrance. The total intake volume (that is, the aggregate volume of the plumbing, intake manifold, runners, etc. between an upstream intake manifold throttle and the cylinder intake valves is roughly equal to the engine displacement (that is, a 2.0 liter engine would be expected to have 2.0 liters of induction volume). Affixation of individual throttles in close proximity to their associated intake valve (s) can dramatically reduce this induction volume and thus substantially improve cylinder induction speed and charge density. When these induction system improvements synergistically interact with individual turbochargers having turbine inlets affixed in close proximity to cylinder exhaust valves, engine performance improvements are realized. Such systems can reduce turbocharger turbine wheel inertia and capture exhaust blow-down pulse energy, which many earlier systems have failed to do. Implementation of low-inertia turbochargers further enhances this energy harvesting and compressed air generation function.

As noted above, some earlier systems have utilized turbochargers to correct for undersized engine torque and horsepower shortcomings. However, because turbochargers operate at very high RPM (e.g., 100,000 to 200,000 RPM), drivers notice the period of time required to ramp up to such operating levels, commonly known as "turbo lag," resulting in sluggish vehicle performance during acceleration from a standing start. This sluggish performance is typically experienced between idle mode operation (e.g., ~600-900 RPM) up to ~3,000 RPM during acceleration from a standing start. There are some fundamental problems responsible for this sluggish performance that are addressed and eliminated by implementations of synergistic induction and turbocharging herein: (1) significantly long intake manifold filling time from idle to acceleration due to intake manifold vacuum during and to help control idle mode operation (acceleration requires converting vacuum to atmospheric positive pressure to begin engine torque rise) and the large volume of the intake manifold and related plumbing; (2) peak engine torque being delayed until high RPM operation (typically between 3,000 and 4,400 RPM, which is well above where it is needed (between idle and ~3,000 RPM); and (3) delayed turbocharger boosting benefits due to the long ramp up time from idle up to ~150,000 RPM. Earlier systems that have added turbochargers to compensate for small engine power shortfalls cause delays and earlier systems have failed to recognize and utilize interdependent synergistic induction and turbocharging to overcome the engine power shortfall and concurrently avoid turbo lag (a vehicle operator typically perceives turbo lag when the delay is more than 300 milliseconds).

Implementations of synergistic induction and turbocharging described herein provide concomitant improved fuel economy and enhanced engine performance. Frequently, improvements to fuel economy have limited and/or diminished engine performance and, similarly, enhancements to engine performance have degraded fuel economy. More specifically, synergistic induction and turbocharging improves fuel economy because "real time" torque is greater under acceleration conditions and provides various benefits, including (without limitation): the use of lower numerical axle ratios, lower "K" factor torque converters, earlier (i.e., lower engine RPM) shift schedules, and more time and operating modes with fuel delivery held to a 14.6 to 1 air fuel ratio.

Poor acceleration response can be markedly improved by using an individual throttle to regulate combustion air flow through each intake port in the engine (e.g., using a single close-proximity throttle for each cylinder where each cylinder has one intake port, and using a single close-proximity throttle for each intake port where each cylinder uses two or more intake ports). A single throttle has traditionally been located at the inlet of the engine induction system (typically upstream of and near the inlet to an intake manifold), which results in long fill time when switching from idle vacuum to acceleration positive pressure charging. Stated another way, in earlier engine systems in which a single throttle is located at the intake manifold entrance, an induction system vacuum is created when the throttle is closed, substantially dropping pressure in the intake manifold and any intake runners and other downstream apparatus used to supply combustion air to the cylinders. When such a throttle is opened to begin acceleration, the induction system's low-pressure (e.g., vacuum) volume between the throttle and the combustion cylinder intake valves must be filled to provide acceleration positive pressure charging (e.g., atmospheric pressure) to the intake valves. Moreover, implementations of synergistic induction and turbocharging are more efficient, responsive and stable than systems utilizing intake valves to throttle combustion air flow into combustion cylinders. Moreover, implementations of synergistic induction and turbocharging can remove perceptible turbo lag in internal combustion engine systems.

Acceleration response in an engine includes the dynamics of three functional stages: (1) before combustion, (2) during combustion, and (3) after combustion. The stage before combustion is referred to as charge loading, referring to the charge density at the intake valves immediately before they open. Ideally, the charge density would preferably be equal to one bar, or 14.7 psi (i.e., atmospheric pressure). Lower pressures slow transient response (i.e., the time it takes for the engine to respond to a change in throttle position).

As seen schematically in FIG. 1, an internal combustion engine system 100 includes an induction system 110 providing combustion air to a combustion cylinder array system 140, which in turn discharges exhaust gas to drive a turbocharging system 180, which then delivers the exhaust gas to an exhaust system 190. In some implementations a portion of the exhaust gas can be used in an exhaust gas recirculation (EGR) system. One or more individual throttles are provided for each combustion cylinder in engine system 100 to regulate combustion air flow in each cylinder intake port and to provide approximately atmospheric pressure at the upstream surface of the throttle plates, each of which is operationally affixed in close proximity to each cylinder's intake valve system (which typically consists of either one intake valve or two intake valves). This substantially reduces or minimizes the induction volume between each throttle plate and its associated intake valve system so that implementations of synergistic induction and turbocharging dramatically reduce induction fill time and increase charge density when compared with earlier induction systems and engine systems. Moreover, in some implementations, this improved induction performance is combined synergistically with enhanced turbocharging, resulting in improved fuel economy (e.g., for passenger vehicles and light trucks that have more frequently been outfitted with small engines), improved engine performance (especially at tip-in), and the mitigation or elimination of perceptible turbo lag.

In one or more implementations of synergistic induction and turbocharging illustrated in FIG. 1, several cylinders are housed within and/or defined by a cylinder block and a cylinder head 102 that also typically defines a plurality of intake ports and exhaust ports for the cylinders. Each cylinder is configured to contain periodic combustion of a mixture of fuel and combustion air (the charge). Moreover, each cylinder has a cylinder displacement that is defined as the area of the cylinder bore times the piston stroke in the cylinder.

Figure 2A:
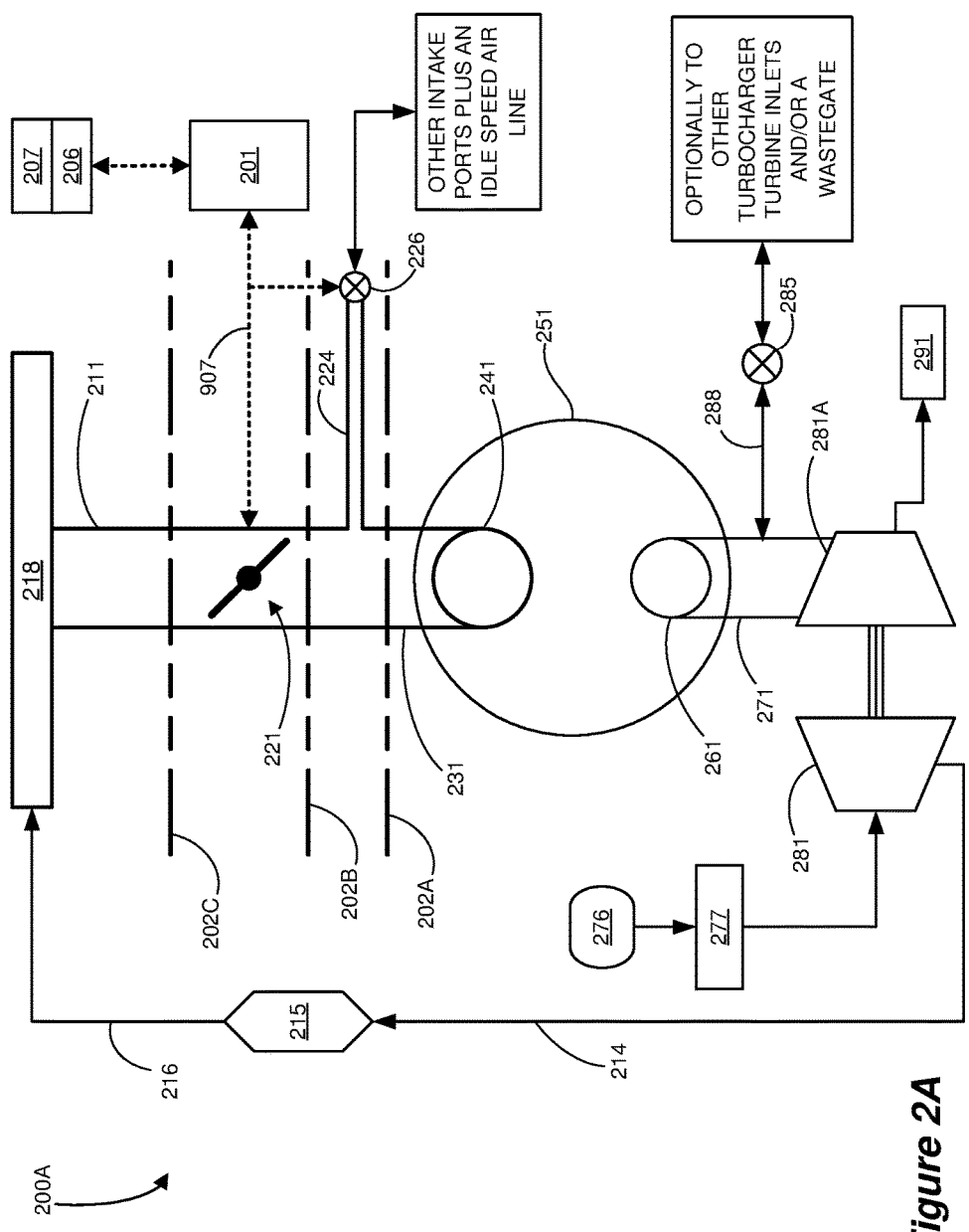
FIG. 2A illustrates one or more internal combustion engine system combustion cylinder assemblies.
Figure 2B:
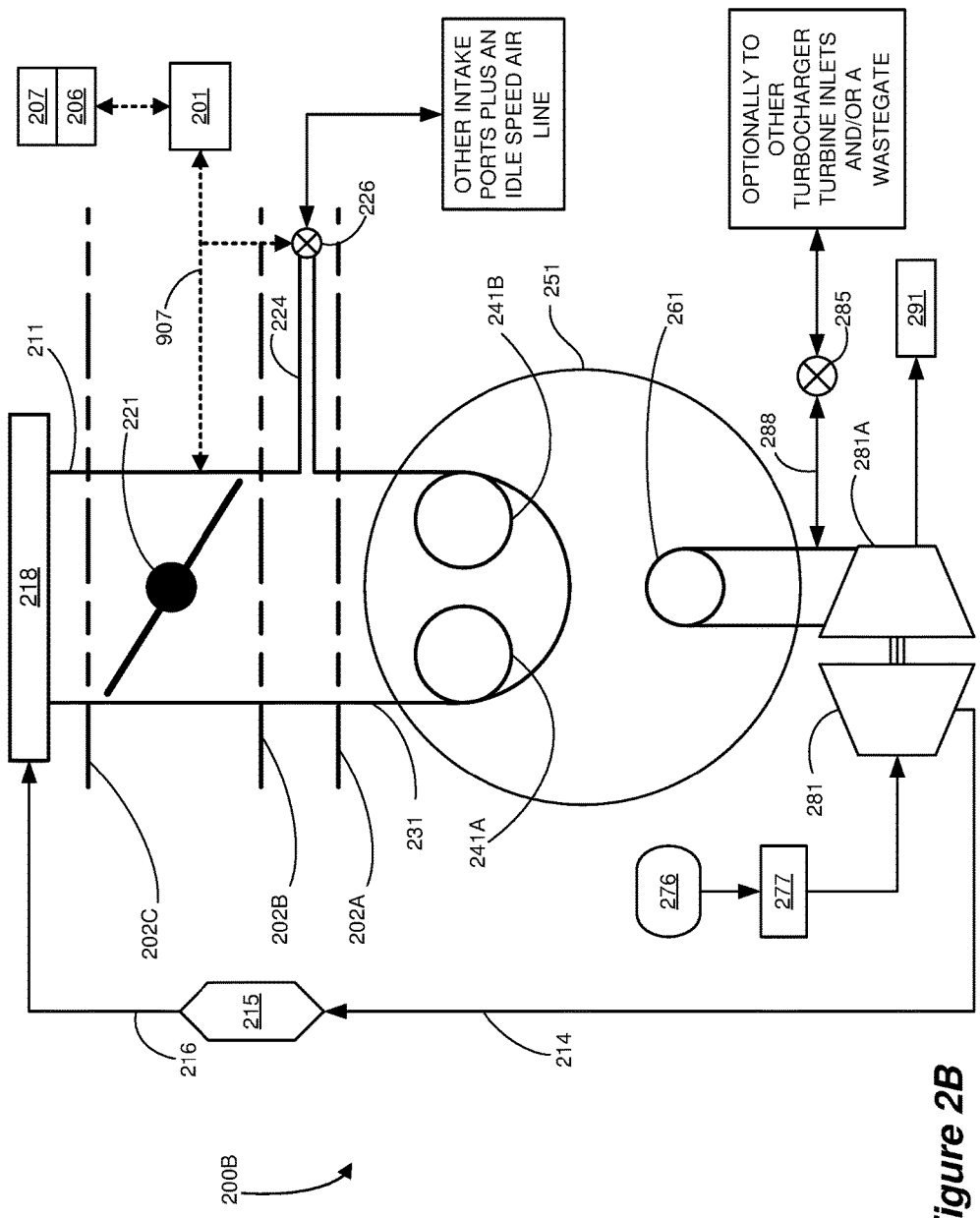
FIG. 2B illustrates one or more internal combustion engine system combustion cylinder assemblies.
Figure 3:
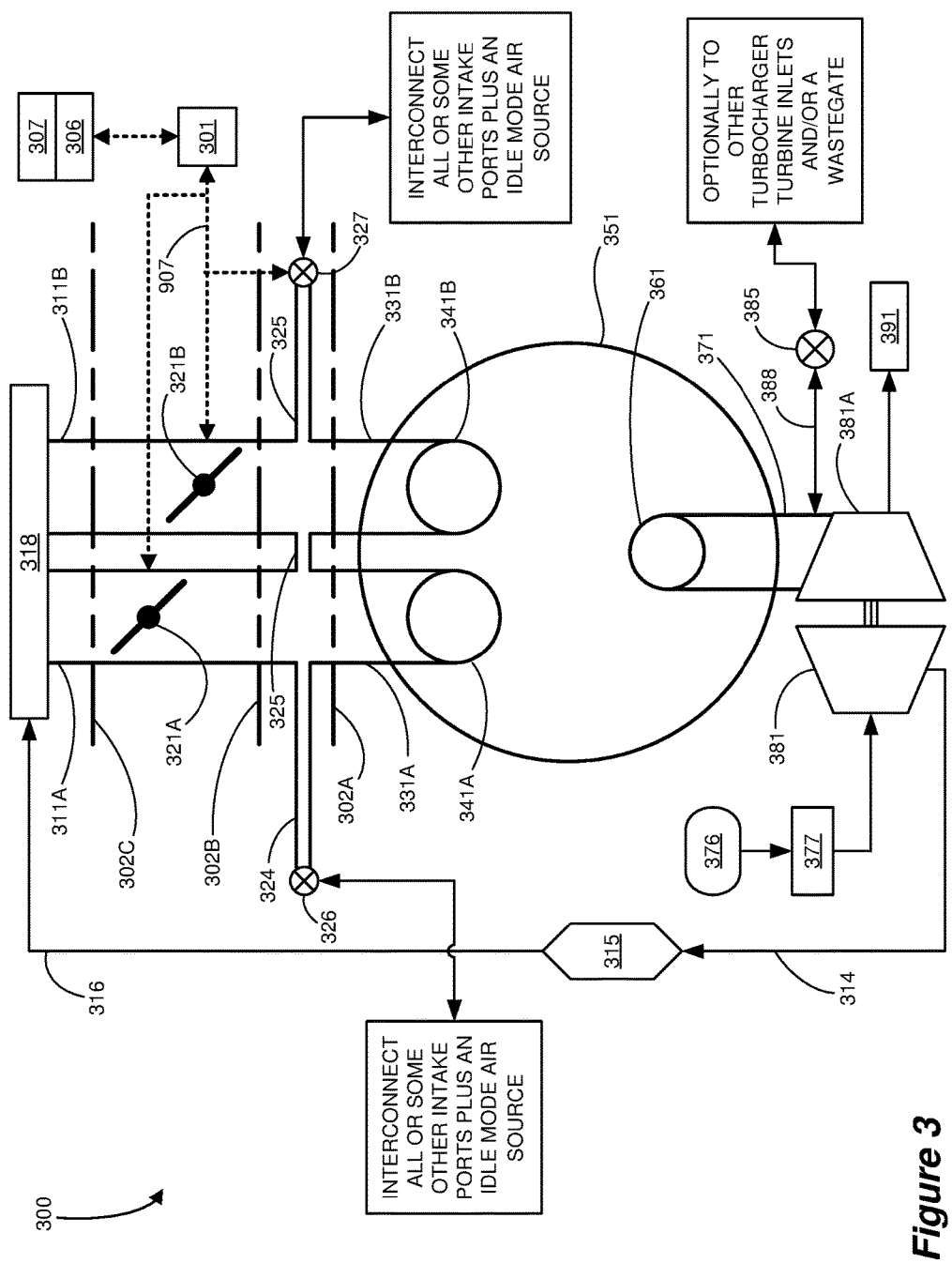
FIG. 3 illustrates one or more internal combustion engine system combustion cylinder assemblies.

Three basic cylinder intake configurations (comprising intake ports and intake valves) will be used to assist in describing non-limiting, illustrative examples of synergistic induction and turbocharging. In a first cylinder intake configuration (referred to as "Intake Configuration 1"), each combustion cylinder has a single intake port that provides combustion air to an intake valve system having a single intake valve that controls the admission of combustion air into the cylinder (one example of Intake Configuration 1 is shown in FIG. 2A, with intake port 231 supplying combustion air to cylinder 251 through a single intake valve 241). In a second cylinder intake configuration (Intake Configuration 2), each combustion cylinder has a single intake port but utilizes two intake valves in the intake valve system to control combustion air flow into the cylinder (one example of Intake Configuration 2 also is shown in FIG. 2B, with intake port 231 supplying combustion air to cylinder 251 through two intake valves 241A and 241B). In the third illustrative configuration (Intake Configuration 3), each cylinder has two intake ports, each of which supplies combustion air to a distinct intake valve system, each of which has a single intake valve controlling combustion air admission into the cylinder (i.e., two intake ports and two intake valves provide two distinct intake channels (combustion air supply paths)). An example of Intake Configuration 3 is shown in FIG. 3, with intake port 331A supplying combustion air to cylinder 351 through intake valve 341A and intake port 331B supplying combustion air to cylinder 351 through intake valve 341B. Therefore, in Intake Configurations 1 and 2, a single intake port supplies combustion air to an intake valve system that can have one or two intake valves, respectively. In Intake Configuration 3, each cylinder has two intake valve systems, one for each intake port supplying combustion air to the cylinder. Engine systems in which these configurations and their associated implementations of synergistic induction and turbocharging can be used include spark-ignited engines having two or more combustion cylinders.

Each cylinder also has an exhaust valve system that includes at least one exhaust valve that controls the discharge of exhaust gas from the cylinder to an exhaust channel. A cylinder's exhaust channel includes an exhaust port and any runner or other extension of the exhaust port pathway for exhaust gas. Similarly, a cylinder's intake channel includes an intake port that supplies combustion air to the cylinder intake valve system plus any runner(s) or other combustion air pathway connected to the intake port for supplying combustion air to the cylinder.

In FIG. 1, combustion cylinder 151 has an intake valve system that includes one or more intake valves 141 connecting cylinder 151 to a combustion air source 118 via a combustion air intake channel (e.g., intake runner(s) 111 and intake port(s) 131, where at least one intake port 131 is defined inside cylinder head 102 and an intake runner 111 is external to the cylinder head 102). In some implementations the intake ports and exhaust ports of the combustion cylinders are defined by the cylinder head 102. A throttle mechanism for cylinder 151 includes one or more throttles 121, each of which is operationally mounted to or within a runner 111 (or mounted to or within an intake port 131, or mounted at the interface between an intake runner 111 and an intake port 131). Each throttle includes a throttle plate (or similar component) affixed in close proximity to its associated intake valve system, such as intake valve(s) 141 of cylinder 151's intake valve system. Each throttle plate (or similar component) can be fixed on a shaft that is rotatably mounted in the walls of an intake channel that can comprise an intake port, intake runner and/or other intake passage to control the flow of air by movement between a closed throttle or engine idle mode position an open throttle position.

Generally, implementations of synergistic induction and turbocharging utilize a throttle mechanism (comprising one or two throttle plates) affixed in close proximity to a cylinder's intake valve system (comprising one or two intake valves). Thus a throttle-to-intake volume can be identified between each cylinder's throttle mechanism and its intake valve system (i.e., the cylinder throttle mechanism is separated from the intake valve system by the throttle-to-intake volume). Where only one intake port regulates combustion air flow to a cylinder (as in Intake Configurations 1 and 2, above), one throttle is used for that cylinder, and the throttle-to-intake volume is defined as the volume separating that throttle from any intake valve(s) in that cylinder's intake valve system (where the throttle and intake valve(s) are closed). Where two separate intake ports regulate combustion air flow to a cylinder, two throttles are used for each cylinder (one throttle regulating air flow in each intake port), and that cylinder's total throttle-to-intake volume is defined as the sum of the volumes that separate the throttles from their respective intake valves (that is, the sum of each intake channel between its throttle and its associated intake valve (s), as in Intake Configuration 3), again where the throttles and intake valves are closed. It should be noted that in cylinders with multiple intake ports, each intake channel's throttle-to-intake volume does not have to be equal to the other(s), meaning that throttle plates for the same cylinder's intake can be affixed to define different volumes between the throttle plate and its associated intake valve system.

More specifically, when a cylinder has an intake valve system comprising a single intake valve supplied with combustion air by a single intake port (e.g., Intake Configuration 1 and/or as illustrated in the non-limiting example of FIG. 2A), in some implementations a throttle plate affixed in close proximity to the intake valve system is operationally mounted to control combustion air flow through the intake port and so that the throttle-to-intake volume is less than or equal to 80% of the cylinder's displacement, where the throttle-to-intake volume is defined as the intake channel volume between the throttle plate and the intake valve when both are closed (where the intake channel volume may include intake port volume and intake runner volume, if any, between the closed throttle plate and closed intake valve, not including any equalizing port(s) volume).

When a cylinder has an intake valve system comprising a single intake valve supplied with combustion air by a single intake port, in some implementations a throttle plate affixed in close proximity to the intake valve system is operationally mounted to control combustion air flow through the intake port and so that the throttle-to-intake volume is less than or equal to 60% of the cylinder's displacement.

When a cylinder has an intake valve system comprising a single intake valve supplied with combustion air by a single intake port, in some implementations a throttle plate affixed in close proximity to the intake valve system is operationally mounted to control combustion air flow through the intake port and so that the linear distance the combustion air travels from the throttle plate to the cylinder intake valve is less than or equal to 10 inches, 8 inches, 6 inches, 4 inches or 2 inches.

When a cylinder has an intake valve system comprising multiple intake valves supplied with combustion air by a single intake port (e.g., Intake Configuration 2 and/or as illustrated in the non-limiting example of FIG. 2B), in some implementations a throttle plate affixed in close proximity to the intake valve system is operationally mounted to control combustion air flow through the intake port and so that the throttle-to-intake volume is less than or equal to 80% of the cylinder's displacement, where the throttle-to-intake volume is defined as the intake channel volume defined between the throttle plate and the intake valves when all are closed.

When a cylinder has an intake valve system comprising multiple intake valves supplied with combustion air by a single intake port, in some implementations a throttle plate affixed in close proximity to the intake valve system is operationally mounted to control combustion air flow through the intake port and so that the throttle-to-intake volume is less than or equal to 60% of the cylinder's displacement.

When a cylinder has an intake valve system comprising multiple intake valves supplied with combustion air by a single intake port, in some implementations a throttle plate affixed in close proximity to the intake valve system is operationally mounted to control combustion air flow through the intake port and so that the linear distance the combustion air travels from throttle plate to at least one of the intake valves is less than or equal to 10 inches, 8 inches, 6 inches, 4 inches or 2 inches.

When a cylinder has an intake valve system comprising a first intake valve supplied with combustion air by a first intake port and a second intake valve supplied with combustion air by a distinct second intake port (e.g., Intake Configuration 3 and/or as illustrated in the non-limiting example of FIG. 3), in some implementations first and second throttle plates are affixed in close proximity to the intake valve system when the first throttle plate is operationally mounted to control combustion air flow through the first intake port and the second throttle plate is operationally mounted to control combustion air flow through the second intake port and so that the throttle-to-intake volume is less than or equal to 80% of the cylinder's displacement, where the throttle-to-intake volume is defined as the sum of (a) the first intake channel volume defined between the first throttle plate and the first intake valve when both are closed plus (b) the second intake channel volume defined between the second throttle plate and the second intake valve when both are closed.

When a cylinder has an intake valve system comprising a first intake valve supplied with combustion air by a first intake port and a second intake valve supplied with combustion air by a distinct second intake port, in some implementations first and second throttle plates are affixed in close proximity to the intake valve system when the first throttle plate is operationally mounted to control combustion air flow through the first intake port and the second throttle plate is operationally mounted to control combustion air flow through the second intake port and so that the throttle-to-intake volume is less than or equal to 60% of the cylinder's displacement.

When a cylinder has an intake valve system comprising a first intake valve supplied with combustion air by a first intake port and a second intake valve supplied with combustion air by a distinct second intake port, in some implementations first and second throttle plates are affixed in close proximity to the intake valve system when the first throttle plate is operationally mounted to control combustion air flow through the first intake port and the second throttle plate is operationally mounted to control combustion air flow through the second intake port and so that the linear distance the combustion air travels between each throttle plate and its associated intake valve is less than or equal to 10 inches, 8 inches, 6 inches, 4 inches or 2 inches. A throttle mechanism separated from a cylinder intake valve system by an intake manifold is not affixed in close proximity to that cylinder intake valve system.

Each throttle plate is operationally mounted to control combustion air flow through one of the intake ports. Thus, in intake valve systems having a single intake port servicing a single cylinder, there is a single throttle controlling combustion air flow through that intake port (e.g., in Intake Configurations 1 and 2 described above). Where multiple intake ports independently supply combustion air to a cylinder (e.g., in Intake Configuration 3 described above), there is an individual throttle for each such intake port. Throttle plates can be operated in unison in a given engine system, or they can be operated in a staged manner, grouping throttles into subsets that are operated independently in a manner that is appropriate for the desired performance characteristics of the engine system.

Exhaust gas is discharged from combustion cylinder 151 via an exhaust valve system that includes at least one exhaust valve 161 controlling the discharge of exhaust gas to an exhaust channel (e.g., exhaust port 171). The discharged exhaust gas powers a turbocharger 181 that has a turbine inlet affixed in close proximity to exhaust valve 161. In some implementations a turbocharger turbine inlet affixed in close proximity to its associated exhaust valve is operationally mounted or otherwise situated so that an exhaust-to-turbine volume is less than or equal to 80% of the cylinder displacement, where the exhaust-to-turbine volume is defined as the exhaust channel volume between a closed exhaust valve and the turbocharger's turbine inlet (where the exhaust channel volume includes any exhaust port volume and exhaust runner volume, if any, between the closed exhaust valve and the turbocharger's turbine inlet, not including any balancing port(s) volume). In some implementations a turbocharger turbine inlet affixed in close proximity to a cylinder exhaust valve can be operationally mounted or otherwise situated so that the cylinder's exhaust-to-turbine volume is less than or equal to 60% of the cylinder displacement. In some implementations a turbocharger turbine inlet affixed in close proximity to its associated exhaust valve is operationally mounted or otherwise situated so that exhaust gas discharged from a cylinder still possesses its pulse characteristics as it enters the turbocharger turbine inlet. In some implementations a turbocharger turbine inlet affixed in close proximity to its associated exhaust valve is operationally mounted or otherwise situated so that the linear distance the exhaust gas travels from exhaust valve to the turbocharger turbine inlet is less than or equal to 10 inches, 8 inches, 6 inches, 4 inches or 2 inches. A turbocharger separated from a cylinder exhaust valve by an exhaust manifold is not affixed in close proximity to that cylinder exhaust valve.

Similar routing of combustion air and exhaust gas and spacing of throttle plates and turbochargers can be implemented with regard to cylinder 152 (using an intake channel having intake runner(s) 112 and intake port(s) 132, a throttle mechanism including one or more throttles 122, an intake valve system having one or more intake valves 142, cylinder 152, at least one exhaust valve 162, an exhaust channel including at least one exhaust port 172, and turbocharger 182) and with regard to cylinder 153 (using an intake channel having intake runner(s) 113 and intake port(s) 133, a throttle mechanism including one or more throttles 123, an intake valve system having one or more intake valves 143, cylinder 153, at least one exhaust valve 163, an exhaust channel including at least one exhaust port 173, and turbocharger 183). Again, as noted, implementations of synergistic induction and turbocharging can be implemented in engine systems having 2 or more combustion cylinders and descriptions of and references to Figures having three cylinders are non-limiting examples.

In some implementations a plurality of equalizing ports interconnect the cylinders' intake ports to generally uniformly distribute combustion air flow to the cylinder intake ports during idle mode operation of the engine system 100. These equalizing ports also help to accommodate differing amounts of throttle leakage when the one or more throttles per cylinder are closed, which could otherwise lead to unstable engine idle mode operation. Each equalizing port comprises a proportionally-sized passage (e.g., to provide the desired idle mode combustion air flow and distribution, and/or to remove the effects of throttle leakage (which typically differ from throttle to throttle) when the throttles are closed). Each equalizing port also can comprise an equalizing port valve that controls air flow through its respective passage.

In FIG. 1 equalizing port 124 connects combustion cylinder 151's intake port (e.g., having a connection point at intake runner 111 and/or intake port 131) to combustion cylinder 152's intake port (e.g., having a connection point at intake runner 112 and/or intake port 132). Equalizing port connections can be placed just downstream of their respective throttles 121 and 122 and upstream of respective intake valves 141 and 142 of combustion cylinders 151 and 152, respectively. Equalizing port 124 can be an open passage or may utilize a valve 126 or other flow control device that can open and close port 124 to control air flow through port 124. Pressure spikes, peaks, valleys, etc. (i.e., differences in pressure between combustion cylinders) can disrupt or otherwise negatively affect air flow in the combustion cylinders. Therefore, equalizing ports can be employed during idle (where very small air flows provide conditions for more substantial pressure and flow differences that can destabilize idle operation) and during other operating conditions to assist in mitigating some pressure and/or flow differences. Under acceleration modes it is advantageous to harvest peak pressures during induction filling which will have a ramming effect, increasing charge density and subsequent engine output (e.g., by closing the equalizing ports to prevent cross channel flow). Moreover, higher velocity filling provides more charge motion after the intake valve is closed, which allows higher levels of EGR, thus lowering NOx emissions and improving fuel economy.

Similarly, equalizing port 125 connects combustion cylinder 152's intake port (e.g., having a connection point at intake runner 112 and/or intake port 132) to combustion cylinder 153's intake port (e.g., having a connection point at intake runner 113 and/or intake port 133) just downstream of their respective throttles 122 and 123 and upstream of the respective intake valves 142 and 143 of combustion cylinders 152 and 153, respectively. Equalizing port 125 also can be an open passage or may have a valve 127 or other flow control device that can open and close port 125 to control air flow through port 125. Each equalizing port 124, 125 acts as an idle mode air flow equalizing port that assists in stabilizing combustion air flow to the combustion cylinders 151, 152, 153 when engine system 100 is operating in idle mode and all of the throttles 121, 122, 123 are closed. Such stabilizing combustion air flow during idle mode operation allows for smoother engine operation. Ports 124, 125 may be used in other engine operating conditions as well in some implementations.

In some implementations each throttle 121, 122, 123 can be defined by a throttle body or housing that includes operational mounting of a throttle plate just upstream of a connection point for one or more of the equalizing ports 124, 125. In other implementations the connection points for equalization ports 124, 125 may be distinct from the throttle structures.

One or more sensors 128 can be connected to the cylinder array (and/or other components of the engine system 100) to provide operational and other data to an engine control system 101 (e.g., an engine control unit (ECU) or the like). For example, combustion air temperature and pressure can be measured and supplied to engine control system 101 to permit proper air-to-fuel ratios for optimal or desired combustion characteristics (e.g., charge density is dependent upon temperature and density of the combustion air used). Thus air pressure during idle mode operation and/or in other operating conditions can be measured and that data utilized accordingly. In FIG. 1 engine control system 101 includes one or more processors 902, memory 903 and one or more interfaces 905. Engine control system 101 can also include circuitry such as the circuitry used in an engine control unit (ECU) as well as collected and stored data and other aspects of engine mapping. As disclosed herein, various systems, apparatus, methods, etc. can be implemented in connection with such an engine control system, for example, through data processing and control logic that depends on one or more engine system parameters and/or conditions. Sensors and the like can transmit data to engine control system 101 using interfaces and links, after which engine control system 101 can generate control commands, signals and the like to various engine system components (sensor and/or other types of data can be collected and control signals deployed via communication lines 907, non-limiting examples of which are shown in the Figures). As is known to those skilled in the art an ECU or similar control system can be configured to receive a variety of inputs (e.g., pressure, temperature, mass air flow, vehicle operator actions and inputs, engine speed and/or load) and to control a variety of functions and components (e.g., throttle control system(s), turbochargers, valves, air flow controls, exhaust gas controls, wastegates).

An idle mode combustion air supply line 137 is connected to at least one of the cylinders' combustion air intake channels (e.g., runner 113 or intake port 133) downstream of any throttle associated with that air intake channel (e.g., at the same connection point as equalizing port 124 or 125). Combustion air flow through line 137 can be regulated or otherwise controlled by a throttle bypass valve 129 that selectively regulates the flow of combustion air (e.g., from combustion air source 118 and/or line 116) through ports 124 and 125 to the intake valves 141, 142, 143 when engine system 100 operates in idle mode. The combustion air is provided at a level that permits smooth idling while the three throttles 121, 122, 123 are closed.

During operation, while engine system 100 is idling, all three throttles 121, 122, 123 are closed and combustion air is fed to intake valves 141, 142, 143 through line 137 via ports 124 and 125 (e.g., equalizing port valves 126 and 127, if used, may be open when the engine system operates in idle mode and are closed in all other operating conditions—there may be other alternative utilizations of ports 124 and 125 and the like in operating conditions other than idle operation in some implementations). In some implementations, when a motor vehicle engine control system 101 or the like determines that the engine is no longer operating in idle mode (e.g., based on data collected from the motor vehicle's brake pedal 107 and/or accelerator pedal 106), valves 126 and 127 close ports 124 and 125, respectively, thus sealing off each combustion cylinder's air intake channel downstream of its respective throttle. When the motor vehicle operator depresses the accelerator pedal 106, throttles 121, 122, 123 are opened and pressurized air (e.g., air at approximately atmospheric pressure) that has built up on the upstream faces of the throttle plates of throttles 121, 122, 123 is released to rapidly fill cylinders 151, 152, 153 (e.g., again at approximately atmospheric pressure, a higher charge density than in earlier systems). Because the throttle-to-intake volume between each throttle mechanism and its respective intake valve system is relatively small, cylinders 151, 152, 153 hyper-fill (i.e., they fill very rapidly with a higher density charge), which substantially improves the engine system's transient response (i.e., the time it takes for the engine to respond to a change in throttle position) of engine system 100 as compared to earlier induction systems. The higher charge density is the result of combustion air filling the cylinders is at approximately atmospheric pressure, thus "packing" more air into each cylinder, and thus increasing the initial power generated in each cylinder, as well as generating a greater volume of exhaust gas possessing more harvestable energy than would otherwise be produced. The larger exhaust gas output of each cylinder substantially improves the turbocharger response both in terms of response time and pressurization of compressed air delivered for further combustion in the cylinders.

Engine power ramp-up in earlier engine systems was negatively affected by the vacuum created by an intake manifold, namely the pressure difference between the intake manifold and atmospheric pressure. More specifically, in such earlier, naturally aspirated engine systems, a piston moving within a cylinder creates an intake manifold vacuum due to reduced airflow that is choked by a throttle situated at the intake manifold entrance, restricting airflow through the engine (and thus the power generated by the engine). Stated another way, this airflow restriction into the intake manifold results in unused power potential in a gasoline engine. Mass air flow through an engine determines that engine's power and can be calculated by multiplying the engine's rotation rate times its displacement and density of inflowing combustion air. Earlier engine systems' constrained combustion air inflow (created by an upstream vacuum) reduced the combustion air density and thus engine power (and also generated engine drag).

More specifically, in a naturally aspirated engine, the induction volume between a traditionally-located throttle body (i.e., upstream of an intake manifold) and the combustion cylinders' intake valves is typically equal to the engine's displacement (i.e., for a 2.0 liter engine, the induction volume that must be filled after the throttle is opened is typically approximately 2.0 liters). In turbocharged engines, the induction volume increases substantially (e.g., doubling) due to the addition of one or more turbocharger compressors, an intercooler and the plumbing required to implement these additional components. In implementations of synergistic induction and turbocharging disclosed and claimed herein, the use of an individual throttle for each cylinder intake port in engine system 100, when transitioning (i.e., ramping up) from idle mode to acceleration mode (i.e., prior to combustion and prior to exhaust gas driving any turbocharger), significantly raises the density of the combustion charge entering the cylinders and significantly quickens the filling of each combustion cylinder 151, 152, 153. In addition to significantly increasing the initial power ramp-up from each combustion cylinder, improved induction and cylinder filling due to synergistic induction and turbocharging increases exhaust gas volume to initiate, drive and accelerate turbocharger output.

Thus combustion cylinders 151, 152, 153 each receive a denser charge more quickly. Once combustion has taken place, exhaust valves 161, 162, 163 release exhaust gas into exhaust channels (e.g., exhaust port 171, exhaust port 172, exhaust port 173). Each turbocharger 181, 182, 183 has a turbine inlet that is affixed in close proximity to its associated exhaust valve 161, 162, 163 (e.g., so that exhaust gas driving turbochargers 181, 182, 183 still possess pulse characteristics from their concentrated discharge from the combustion cylinders 151, 152, 153). In some implementations the turbine inlet of each turbocharger 181, 182, 183 is mounted in a direct line with its associated cylinder's exhaust valve 161, 162, 163 so that pulse-characteristic-possessing exhaust gas encounters no turns, thus maximizing the exhaust gas energy harvested by turbochargers 181, 182, 183. In some implementations affixation of a turbocharger turbine inlet in close proximity to its associated exhaust valve can be achieved by mounting a turbocharger directly to the exhaust port of a cylinder (e.g., mounting the turbocharger to the cylinder head, possibly using a gasket and bolts, or other suitable mounting means). In some implementations bidirectional exhaust gas flow balancing passages 188 and optional balancing valves 185, 186 (also referred to as "balancing ports") are used in system 100 to permit improved utilization of available turbocharger capacity and exhaust gas energy, to provide more consistent exhaust gas flow (e.g., constant pressure flow), and to assist in reducing turbulence in the system. For example, if turbocharger 181 is unable to utilize exhaust gas discharged from cylinder 151, that "unused" exhaust gas can be routed to the inlet of turbine of turbocharger 182 when balancing passage 188 and any balancing valve 185 are configured to permit such cross-flow (similarly, exhaust gas can be shared with turbocharger 183 via balancing passage 188 and balance valve 186). The reverse condition exists with exhaust gas discharged from cylinder 152 and available turbocharger capacity in turbochargers 181 and 183. Implementations can utilize balancing passages 188 alone, in connection with balancing valve 185, in connection with balancing valve 186, or all in combination (and this exhaust gas flow balancing can be implemented with a 2-cylinder system and with systems having more than three cylinders). Moreover, optional balancing valves 185, 186 can be configured to permit partial opening of the valves to provide better control of exhaust gas cross-flow within system 100. In some implementations balancing valves 185, 186 operate in tandem (i.e., both open, both closed, etc.) and can be controlled by engine control system 101 (e.g., that receives sensor readings and/or data from the turbochargers 181, 182, 183, the combustion air source 118 and/or other system components and locations). Based on mapping, programming, testing, etc., cross-flow balancing using balancing passages and valves can be programmed and/or available "on the fly" based on changing engine conditions. A wastegate 187 may connect with cylinder 153 and turbocharger 183 to permit wastegating of exhaust gas that cannot be utilized by any of the turbochargers (e.g., when balancing valves are open and intake manifold pressure is too high). If wastegate 187 is implemented (e.g., as a "shared" wastegate), exhaust gas can be directed to exhaust line 193. Other combinations of wastegates and balancing passages and valves can be utilized in connection with implementations of improved turbocharging, as will be appreciated by those skilled in the art.

By affixing the turbine inlet of each turbocharger in close proximity to its associated cylinder exhaust valve, each turbocharger's area ratio (or area/radius (A/R) ratio) can be substantially increased as compared to traditional turbocharger A/R ratios (where a single turbocharger is driven by multiple combustion cylinders and/or receives exhaust gas only after extended, bending travel of the exhaust gas through one or more exhaust runners).

After driving the turbochargers, exhaust gas is delivered to exhaust system 195 via exhaust lines 191, 192, 193 (e.g., to undergo treatment by a catalytic converter 197 and muffler 199 prior to release to the atmosphere, or for use in an EGR system). Air from air cleaner 176 and mass air flow meter 177 is compressed by the compressors of turbochargers 181, 182, 183 and delivered via line 114 to intercooler 115. In some implementations air from intercooler 115 is delivered via line 116 to combustion air source 118, which can be an intake manifold or the like.

Shortly after tip-in as acceleration begins, engine system 100 provides several significant improvements over earlier engine systems. First, combustion air can be provided to combustion cylinders 151, 152, 153 at approximately atmospheric pressure immediately, avoiding the delay due to induction system filling time and low-density charging. Turbocharging system 180 ramps up faster than earlier turbocharging systems due to the higher-density charging and, in some implementations, due to the close proximity of turbochargers 181, 182, 183 to the exhaust valves 161, 162, 163 of cylinders 151, 152, 153. In some implementations turbochargers 181, 182, 183 also are low-inertia turbochargers that provide improved start-up performance (e.g., because of smaller turbine wheel and compressor wheel dimensions and/or lighter-weight materials). These factors (and others in some implementations) generate a bright tip-in response from engine system 100 and can eliminate any perceptible turbo lag in some implementations. Moreover, because initial filling of the combustion cylinders uses denser air and charges, initial combustion in the cylinders generates larger volumes of exhaust gas that likewise get the turbochargers generating compressed air more quickly.

As the engine accelerates, the combustion air supply system 110 continues to provide higher density charges to combustion cylinders 151, 152, 153 due to the upper end performance advantages of the turbocharging system 180 delivering compressed air into the combustion air flow to the cylinders. Moreover, notwithstanding the improved tip-in and bright characteristics of the various implementations utilizing improved induction, turbocharging does not suffer at upper-end performance due to higher engine power levels. Some earlier turbocharging systems also used smaller inlet nozzles to increase the speed of exhaust gas impinging on the turbocharger turbines. These smaller-area nozzles would assist at lower engine speeds and/or loads, but create problems (e.g., back pressure) at higher engine loads. These problems and performance limitations due to smaller nozzle areas are avoided using implementations of synergistic induction and turbocharging described and claimed herein.

FIG. 2A illustrates one or more non-limiting examples of combustion assembly 200A that includes a combustion cylinder 251 and various components, systems, etc. used to operate an internal combustion engine system having multiple combustion assemblies implementing synergistic induction and turbocharging. The engine system in this non-limiting example contains a number of similar combustion cylinder assemblies and accompanying cylinders, only one being shown for clarity. A combustion air source 218 provides combustion air to a combustion air intake channel that may include intake runner 211 and intake port 231. A throttle mechanism includes a throttle plate 221 operationally affixed within the intake channel in close proximity to the intake valve 241 of cylinder 251 to regulate or otherwise control air flow in intake port 231. As noted, the proximity of the throttle 221 to the cylinder intake valve system (i.e., intake valve 241) can be measured as a linear separation between the two components, can be measured by volume (e.g., where the throttle-to-intake volume defined between throttle 221 and intake valve 241 is less than or equal to 80% or 60% of the displacement of cylinder 251), and/or by other means.

A turbine inlet 281A of turbocharger 281 is affixed in close proximity to the exhaust valve 261 of cylinder 251, in some implementations being mounted directly to a cylinder head or otherwise being mounted to or quite near exhaust port 271. Some engine systems may utilize combustion cylinders having multiple exhaust valves, which all feed exhaust gas to a common exhaust port. Implementations of synergistic induction and turbocharging herein include such configurations. Turbocharger 281 can be a low inertia turbocharger having lightweight turbine and compressor wheel components, and/or having small dimensions to permit faster response to exhaust gas discharged from cylinder 251 via exhaust valve 261 and exhaust port 271. In some implementations a balancing passage 288 and optional balancing valve 285 can be connected to exhaust port 271 to permit sharing of exhaust gas between and among turbochargers before being sent to an exhaust and/or EGR system 291 in an internal combustion engine system utilizing combustion assembly 200A. Alternatively, valve 285 can be replaced with a wastegate in some implementations. Balancing passages 288 and valves like valve 285 can interconnect the turbine inlets of a number of cylinders' turbochargers in a given engine to permit exhaust gas sharing. Air from air cleaner 276 and mass air flow meter 277 is compressed by turbocharger 281. The compressed air can be sent via line 214 to an intercooler 215, which supplied source 218 with compressed air via line 216.

One or more equalizing ports 224 are connected to the air intake channel downstream of throttle plate 221 and upstream of intake valve 241, permitting a generally even distribution of combustion air to all cylinder intake valves during idle mode operation of engine system 200A. Equalizing ports 224 can interconnect the intake valves of a number of cylinders in a given engine. Opening and closing of each equalizing port 224 can be controlled by a control valve 226 in some implementations. As can be seen in FIG. 2A, various cylinder head configurations for an internal combustion engine system utilizing combustion assembly 200A can be utilized, as illustrated by alternate cylinder head perimeters 202A, 202B and 202C.

If a cylinder head having border 202A is used, then equalizing port(s) 224 and throttle plate 221 are outside the cylinder head (e.g., having throttle plate 221 mounted within an intake runner 211, or having throttle plate 221 mounted between runner 211 and intake port 231, with equalizing port(s) 224 situated downstream of the throttle 221). Throttle plate 221 and equalization port(s) 224 can be integrally mounted using a throttle body assembly or unitary component that has structure defining both the throttle plate 221 and each equalizing port 224, if desired.

In some implementations equalizing port(s) 224 can be located or defined inside the cylinder head 202B (again, optionally being controlled by a valve 226 or the like). Such a configuration utilizing cylinder head 202B can permit mounting of a throttle directly to the cylinder head to further enhance its proximity to cylinder intake valve 241 (or, in the case of multiple intake valves, as shown in FIG. 2B, in close proximity to the multiple intake valves 241A and 241B).

Finally, both the throttle plate 221 and equalizing port(s) 224 can be contained within (e.g., integrated inside) the cylinder head 202C. The choice of whether to have equalizing port(s) 224 and/or throttle plate 221 inside the cylinder head can be determined on the basis of a number of factors.

In the exemplary alternate configurations of FIG. 2A, use of an individual throttle mechanism per cylinder intake port and operationally affixing each throttle plate in close proximity to its associated intake valve system dramatically reduce induction fill time, resulting in higher combustion charge density supporting higher launch torque under engine acceleration conditions. Stated another way, the combustion assembly 200A, utilizing throttle plate 221 affixed in close proximity to intake valve 241, allows substantially higher density charge filling of cylinder 251 when an engine transitions from idle mode to acceleration.

In some implementations, in operation, combustion air is provided via equalizing port(s) 224 during idle mode operation up until idle mode operation ceases (e.g., when a vehicle engine control system 201 determines that the engine is no longer operating in idle mode). Once that happens, in anticipation of acceleration, valve(s) 226 can be closed by engine control system 201 (which can utilize data from various components such as brake 207 and accelerator pedal 206) in some implementations. In implementations that do not use valve(s) 226, equalizing ports can be passages that are small enough to effectively cease functioning as ports once acceleration commences and the pressure of combustion air moving from throttle plate 221 to intake valve 241 significantly increases. In either case, when the engine ceases idle mode operation, throttle 221 opens allowing cylinder hyper-filling, immediate filling of cylinder 251 with combustion air at approximately atmospheric pressure. This hyper-filling of cylinder 251 produces substantially higher power in the transition from idle mode to higher engine speed and/or load and also provides a greater exhaust gas discharge volume to the turbine inlet 281A of turbocharger 281, which consequently provides higher pressure compressed air via line 214, through intercooler 215 and line 216 to combustion air source 218. This combination of higher power combustion in cylinder 251 and higher energy driving of turbocharger 281 significantly improves the ramp-up of an engine utilizing combustion assembly 200A implementing synergistic induction and turbocharging. The sequence noted herein provides nearly instantaneous tip-in torque improvement under acceleration conditions due to the reduced induction fill time. The effects of high velocity (high inertia) combustion cylinder filling immediately follow from induction fill time improvement and provide additive torque under launch acceleration conditions.

As noted above, some cylinder configurations utilize a single intake port that supplies combustion air to a cylinder through multiple intake valves (Intake Configuration 2). FIG. 2B illustrates a non-limiting example of this alternate configuration in a combustion assembly 200B that is similar to combustion assembly 200A of FIG. 2A, except that intake port 231 supplies air to cylinder 251 through an intake valve system having two intake valves 241A and 241B, instead of a single intake valve. The operation of assembly 200B is the same as that described in connection with assembly 200A of FIG. 2A in all other pertinent aspects. In some engine system operations various operational patterns (that is, uniform and/or non-uniform opening and closing) of multiple intake valves like 241A and 241B of FIG. 2B might be available and can be used in connection with implementations of synergistic induction and turbocharging.

FIG. 3 illustrates further improvements available using implementations of synergistic induction and turbocharging in a combustion assembly 300 in which the combustion cylinder 351 has two intake valves 341A, 341B, each of which receives combustion air through a separate, independent intake port 331A, 331B, respectively. That is, intake port 331A supplies combustion air to cylinder 351 through intake valve 341A, but not through intake valve 341B, and intake port 331B supplies combustion air to cylinder 351 through intake valve 341B, but not through intake valve 341A. Combustion air source 318 thus supplies combustion air to cylinder 351 via two distinct combustion air intake channels. Intake runners 311A, 311B can be used to connect source 318 to intake ports 331A, 331B, respectively. A throttle mechanism includes throttle plate 321A affixed in close proximity to intake valve 341A and throttle plate 321B affixed in close proximity to intake valve 341B. Equalizing ports 324, 325 can be connected downstream of throttles 321A and 321B and upstream of intake valve 341A and 341B, again providing a generally even distribution of combustion air to intake valves 341A and 341B to permit smooth idling of the engine when throttles 321A and 321B are closed (and to compensate for any irregular throttle leakage when the throttles are closed). Equalizing ports 324, 325 can interconnect intake ports 311A, 311B with other cylinders' intake ports, as shown and the positioning of throttle plates 321A, 321B and equalizing ports 324, 325 can be made relative to alternate cylinder head configurations 302A, 302B, 302C. Equalizing ports 324, 325 can be controlled by valves 326, 327 in some implementations.

Opening and closing of throttles 321A and 321B can be performed by engine control system 301 using inputs and data from various sources (e.g., accelerator pedal 306 and brake pedal 307, as well as others).

Beginning combustion using implementations of synergistic induction and turbocharging, the higher volume exhaust gas generated in cylinder 351 is used to drive turbocharger 381, which has a turbine inlet 381A affixed in close proximity to cylinder exhaust valve 361 (e.g., via exhaust port 371). Some engine systems may utilize combustion cylinders having multiple exhaust valves, which all feed exhaust gas to a common exhaust port. Implementations of synergistic induction and turbocharging herein include such configurations. In some implementations one or more balancing passages 388 and optional balancing valves 385 can interconnect exhaust port 371 with one or more additional exhaust ports to permit sharing of exhaust gas between and among turbochargers before being sent to an exhaust and/or EGR system 391 in an internal combustion engine system utilizing combustion assembly 300. Alternatively, valve 385 can be replaced with a wastegate in some implementations. Air from air cleaner 376 and mass air flow meter 377 is compressed by turbocharger 381 and is sent via line 314 to an intercooler 315, and then on to source 318 via line 316.

The availability of two throttles for cylinder 351 in combustion assembly 300 provides options for various modes of combustion air delivery to cylinder 351 both at tip-in and at higher engine speeds and/or loads. As noted in connection with FIGS. 4C and 4D, cylinders having separate, independent intake ports and intake valves can have throttle mechanisms affixed in close proximity to their respective intake valve systems, operating either in unison (that is, all opening and closing together) or in stages or groups comprising subsets of throttles that open and close in preselected sequences.

Figure 4A:
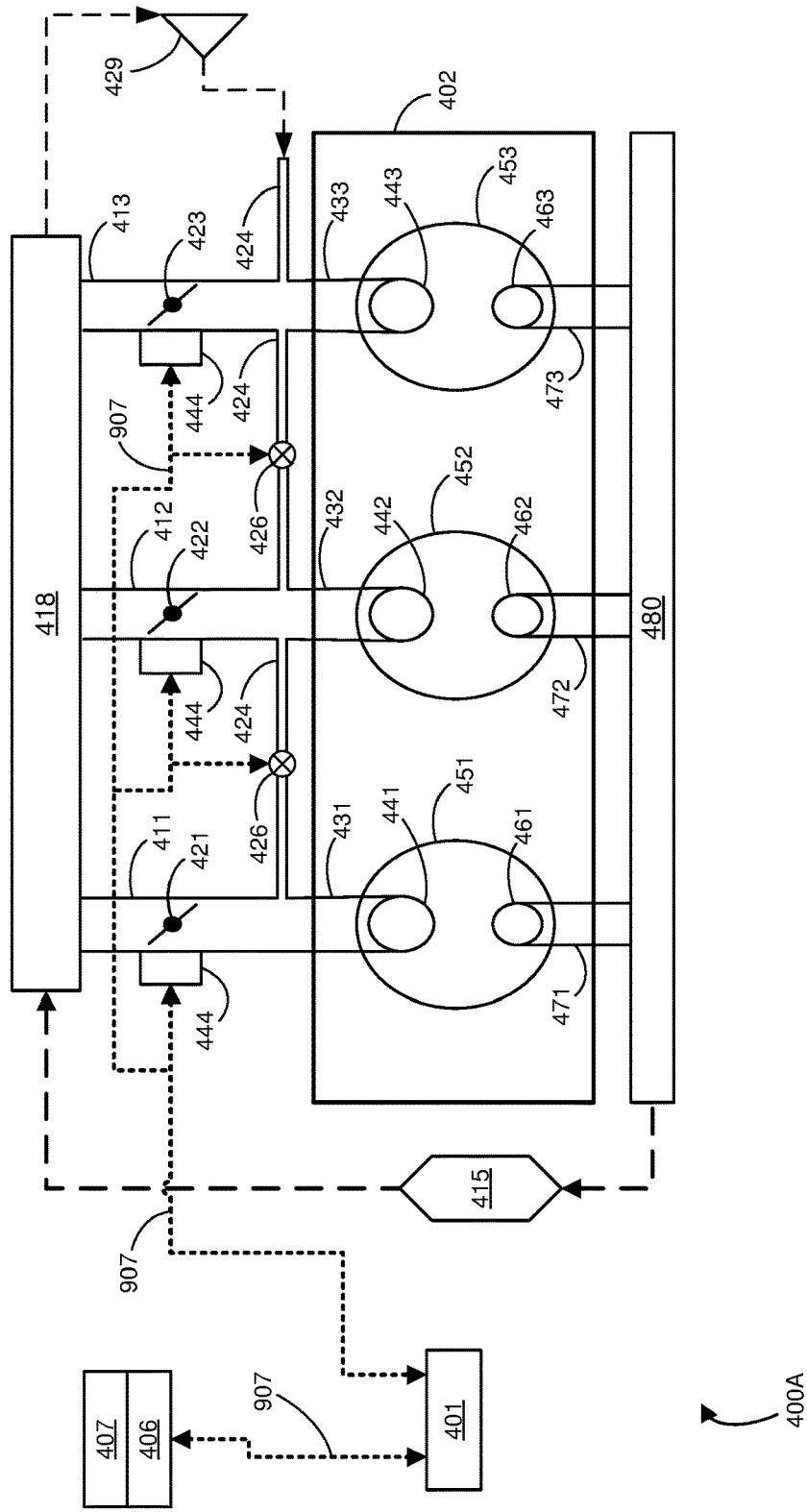
FIG. 4A illustrates an internal combustion engine system.

FIG. 4A illustrates one or more implementations of throttle control for an internal combustion engine system implementing synergistic induction and turbocharging (some components of engine system 400A have been omitted, however components such as those shown in connection with FIGS. 1, 2A and/or 2B may be used). A combustion air source 418 supplies combustion air to air intake channels (e.g., using intake runners 411, 412, 413 and intake ports 431, 432, 433). A single throttle 421, 422, 423 controls combustion air flow in each intake channel for cylinders 451, 452, 453, respectively. Admission of combustion air from the intake channels to cylinders 451, 452, 453 is regulated by the opening and closing a single intake valve 441, 442, 443 in each cylinder 451, 452, 453, respectively (cylinders 451, 452, 453 may include multiple intake valves, examples of which are shown in FIG. 2B and include Intake Configuration 2, and the description of the components and operation of engine system 400A in FIG. 4A may be adapted to such cylinder configurations as well). Throttles 421, 422, 423 are affixed in close proximity to their associated intake valves. A turbocharging system 480 is configured to receive exhaust gas from the cylinders 451, 452, 453 and in some implementations turbocharging system 480 may include a plurality of turbochargers, each individual turbocharger having a turbine inlet affixed in close proximity to its respective cylinder exhaust valve 461, 462, 463 (e.g., via a respective exhaust port 471, 472, 473). Compressed air from turbocharging system 480 is supplied to combustion air source 418, through intercooler 415 in some implementations.

Some implementations of engine system 400A may include equalizing ports 424 configured to evenly distribute combustion air to cylinders 451, 452, 453 when throttles 421, 422, 423 are closed and the engine is operating in idle mode. In some implementations idle mode combustion air flow can be further controlled using valves 426 in equalizing ports 424. Combustion air may be supplied to equalizing ports 424 by an idle mode air valve 429 or the like, which can act as a throttle bypass solenoid. Throttles 421, 422, 423 and/or equalizing ports 424 can be integral to a cylinder head 402 in some implementations.

In implementations illustrated in FIG. 4A, each cylinder's throttle mechanism (including throttles 421, 422, 423) and equalizing port valves 426 are controlled by an engine control system 401 (e.g., an ECU). Engine control system 401 receives various inputs and other data from engine system 400A and a vehicle in which engine system 400A operates. Among these inputs and data include signals from a vehicle accelerator pedal 406 and a vehicle brake pedal 407. The open/close position of each throttle 421, 422, 423 is controlled by a throttle control system that includes an individual actuator 444 controlling each throttle 421, 422, 423. Actuators 444 can be electrical, electronic, electromechanical, magnetic, mechanical or any other suitable device that can control the opening and closing of throttle plates and/or other throttle mechanisms in an engine system (e.g., an electromechanical device including a stepping motor that can change throttle position and being controlled by a control signal or the like, for example from an engine control unit). Generally, many throttle actuators are sensor-based and controllable so that they can regulate the position and rate of change of a throttle plate being controlled and can provide various types of data to an engine control unit or the like.

In operation, engine system 400A operates in idle mode with all of the throttles 421, 422, 423 closed and valves 426 open (thus permitting a generally even distribution of combustion air to cylinder intake valves 441, 442, 443 for smooth idling). When the vehicle cease idle mode operation (e.g., when engine control system 401 determines that idle mode operation has ceased), valves 426 close. In implementations that do not use valves 426 within equalizing ports 424, those equalizing ports 424 are proportioned passages that permit the even distribution of combustion air during idle mode, but are small enough that higher engine speed and/or load operation of engine system 400A is unaffected by the passages. When the vehicle operator then steps on the accelerator pedal 406, engine control system 101 signals actuators 444 to open throttles 421, 422, 423. Because of the close proximity of the throttle mechanisms comprising throttles 421, 422, 423 to their associated intake valve systems comprising intake valves 441, 442, 443, opening of throttles 421, 422, 423 by actuators 444 provides hyper-filling of cylinders 451, 452, 453. The combination of throttles 421, 422, 423 mounted in close proximity to cylinders 451, 452, 453 and turbocharging system 480 provide for synergistic induction and turbocharging that permits improved tip-in and faster ramp-up of engine speed, load and/or power. As noted this performance improvement can be further enhanced by utilizing an individual turbocharger for each cylinder combustion assembly, especially when each turbocharger's turbine inlet is affixed in close proximity to its associated cylinder's exhaust valve and/or when low-inertia turbochargers are used.

Figure 4B:
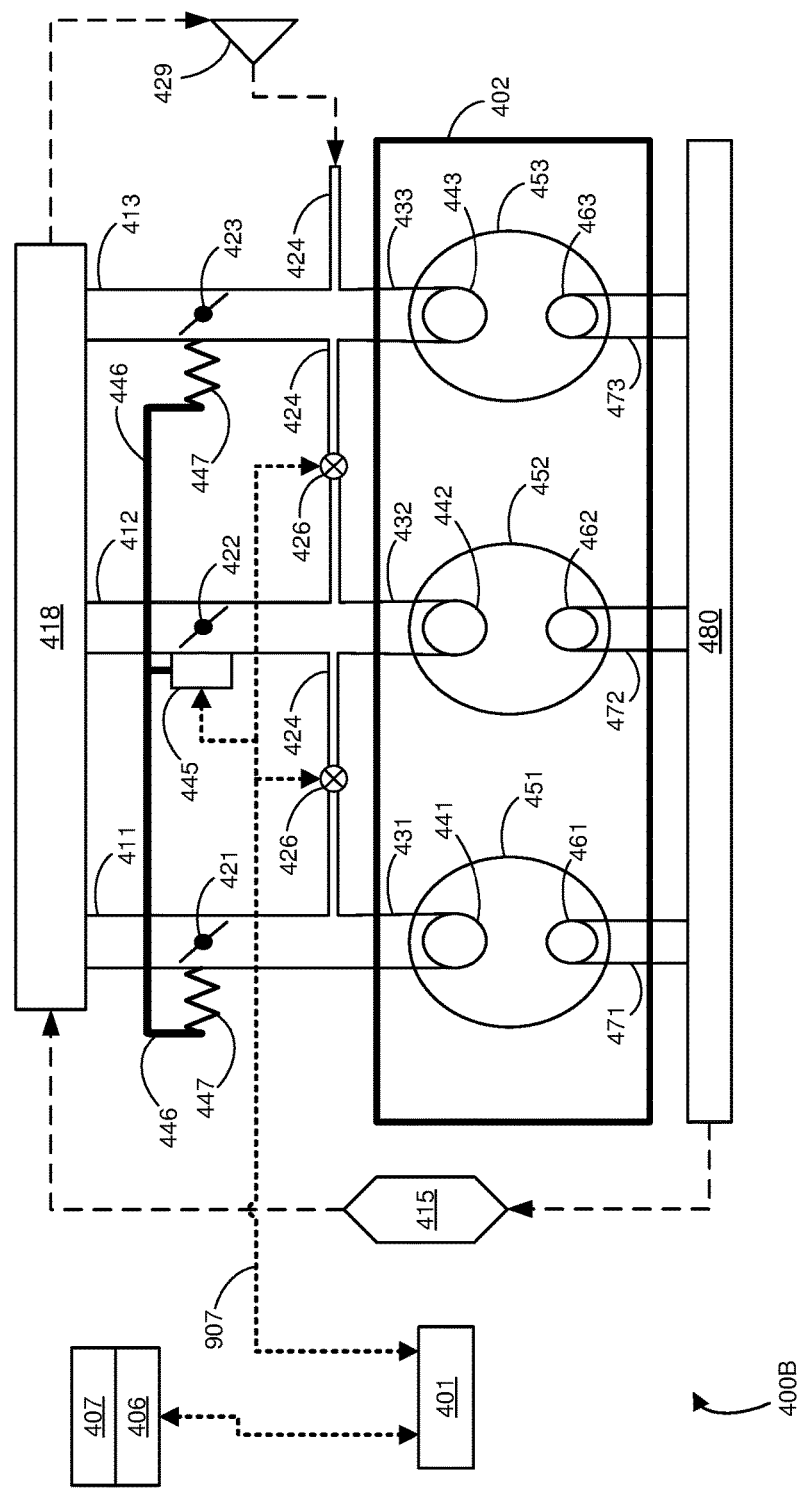
FIG. 4B illustrates an internal combustion engine system.

FIG. 4B illustrates one or more implementations of throttle control for an internal combustion engine system 400B implementing synergistic induction and turbocharging (again, some components of engine system 400B have been omitted, however components such as those shown and discussed in connection with FIGS. 1, 2A and/or 2B may be used). The operation of engine system 400B is similar to that of system 400A of FIG. 4A, except for implementation of a different throttle control structure and operation. Instead of having individual actuators for each throttle, engine system 400B utilizes a throttle control system comprising a single actuator 445 mounted to throttle 422. As with actuators 444 of FIG. 4A, operation of actuator 445 is controlled by engine control system 401. However, in addition to directly controlling throttle 422, actuator 445 is mechanically linked to throttles 421 and 423 using linkage 446, which is thus operationally connected to the respective throttle plates. This linkage 446 can include springs 447 that bias throttles 421, 423 when in their closed positions. Operating throttles 421, 422, 423 with a common actuator employing spring biasing thus helps to ensure closure of multiple throttles in system 400B. The spring bias compensates for variations in the closed positions of the throttle plates in each throttle mechanism, allowing each to be completely closed while all are operated by a common actuator. This reduces the total throttle leakage, improving operation of a throttle bypass solenoid 429 to achieve and maintain stable idle mode engine operation (e.g., by maintaining a stable RPM).

Figure 4C:
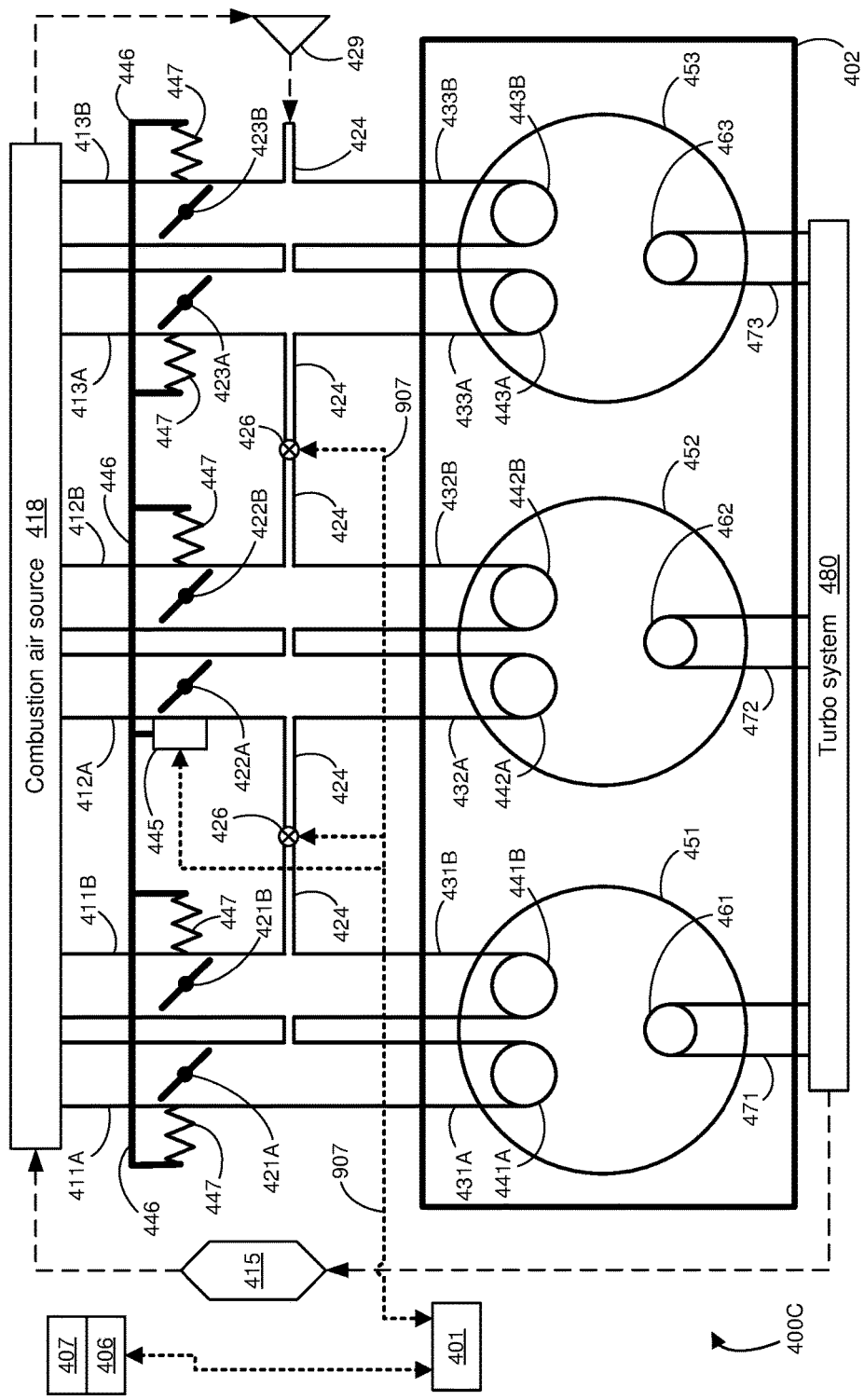
FIG. 4C illustrates an internal combustion engine system.

FIG. 4C illustrates one or more implementations of throttle control for an internal combustion engine system 400C implementing synergistic induction and turbocharging (again, as with engine systems 400A and 400B, some components may be omitted, however components such as those shown and discussed in connection with FIGS. 1, 2A, 2B and 3 may be used). The operation of engine system 400C is similar to that of system 400B of FIG. 4B, except that engine system 400C has combustion assemblies comprising cylinders 451, 452, 453 that utilize multiple intake valves 441A, 441B, 442A, 442B, 443A, 443B; more specifically, each combustion cylinder's intake valve system has two intake valves, each of which is individually supplied with combustion air via an independent intake channel. In the non-limiting example of FIG. 4C there are a total of six throttles 421A, 421B, 422A, 422B, 423A, 423B regulating combustion air flow through the intake runners 411A, 411B, 412A, 412B, 413A, 413B and intake ports 431A, 431B, 432A, 432B, 433A, 433B to cylinders 451, 452, 453. Each cylinder has a throttle mechanism that includes two throttle plates, each of which controls air flow through an individual intake channel connected to a single intake valve. In some implementations of synergistic induction and turbocharging with multiple-intake-valve cylinders, the throttles may be operated in unison (i.e., all throttles are closed and opened identically). The use of a single actuator for each throttle can be employed (similar to the implementation(s) shown in FIG. 4B). FIG. 4C illustrates a throttle control system that includes a common actuator 445 using a mechanical linkage 446 and biasing springs 447 to link all throttles 421A, 421B, 422A, 422B, 423A, 423B and thus produce matched opening and closing of those throttles. Again, because each of throttles 421A, 421B, 422A, 422B, 423A, 423B is affixed in close proximity to its associated intake valve 441A, 441B, 442A, 442B, 443A, 443B, the opening of the throttles by actuator 445 and linkage 446 leads to rapid filling of cylinders 451, 452, 453 with dense combustion charges. This hyper-filling of the combustion cylinders likewise generates more substantial and energetic exhaust gas to drive turbo system 480, which can be a standard turbocharging system or can include a single turbocharger for each cylinder, wherein each turbocharger includes a turbine inlet affixed in close proximity to a single exhaust valve 461, 462, 463.

Figure 4D:
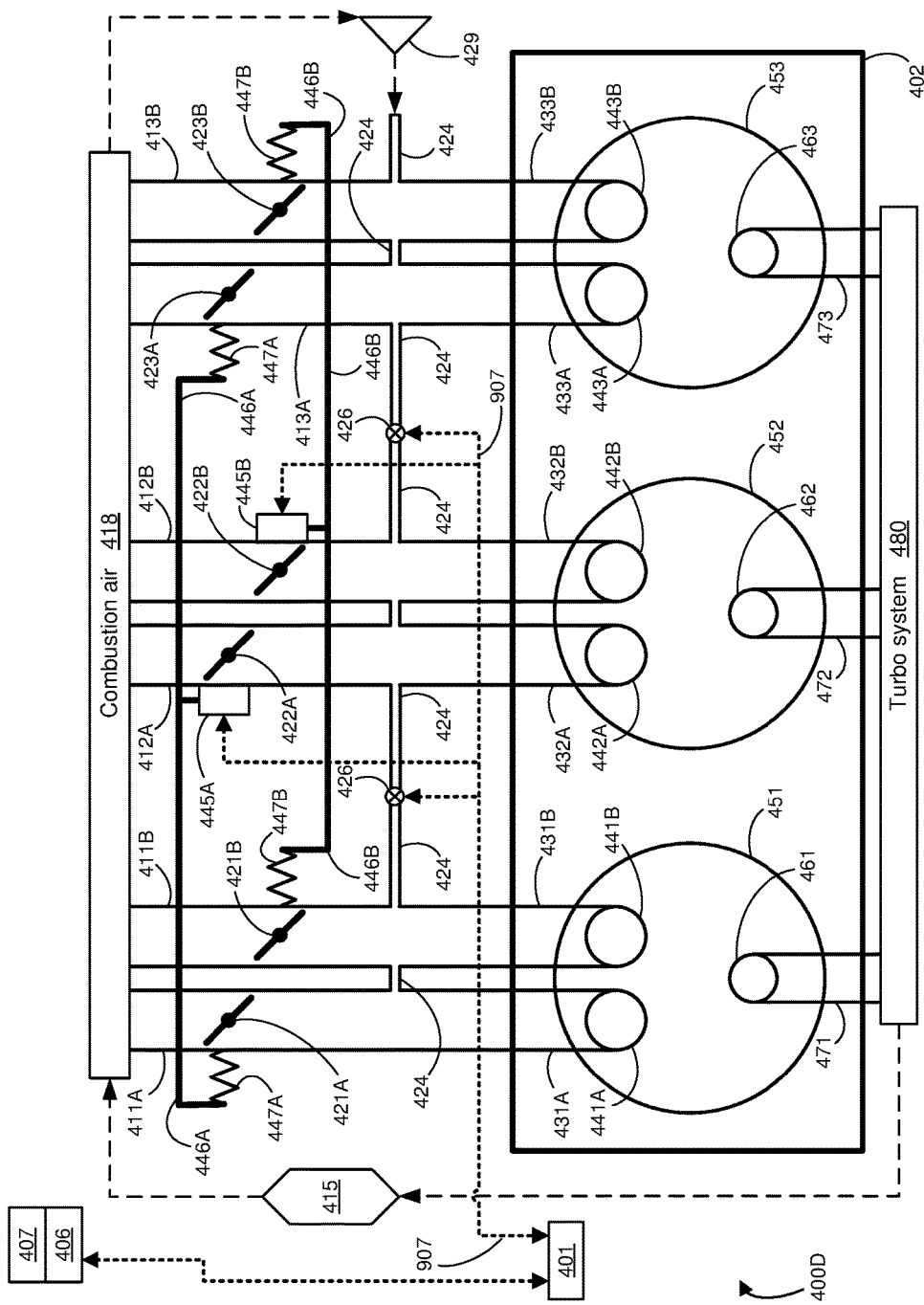
FIG. 4D illustrates an internal combustion engine system.

FIG. 4D illustrates one or more implementations of throttle control for an internal combustion engine system 400D implementing synergistic induction and turbocharging (again, as with engine systems in FIGS. 4A-4C, some components may be omitted, however components such as those shown and discussed in connection with FIGS. 1, 2A, 2B and 3 may be used). The operation of engine system 400D is similar to that of system 400C of FIG. 4C in that cylinders 451, 452, 453 of engine system 400D utilize multiple intake valves 441A, 441B, 442A, 442B, 443A, 443B; more specifically, each combustion cylinder's intake valve system has two intake valves, each of which is individually supplied with combustion air via an independent intake channel. In the non-limiting example of FIG. 4D there are a total of six throttles 421A, 421B, 422A, 422B, 423A, 423B regulating combustion air flow through the intake runners 411A, 411B, 412A, 412B, 413A, 413B, respectively, and intake ports 431A, 431B, 432A, 432B, 433A, 433B, respectively, to cylinders 451, 452, 453, respectively. Each cylinder has a throttle mechanism that includes two throttle plates, each of which controls air flow through an individual intake channel connected to a single intake valve. In some implementations of synergistic induction and turbocharging with multiple-intake-valve cylinders, the set of throttles may be operated in subsets, groups or in a staged manner (i.e., all throttles do not close and/or open identically).

Implementations of synergistic induction and turbocharging illustrated in FIG. 4D utilize staged opening and/or closing of throttles using multiple actuators and linkages that permit opening a subset of the individual throttles to achieve staged induction. FIG. 4D illustrates a throttle control system that includes a first actuator 445A and its associated linkage 446A (including spring biasing 447A) configured to control operation of throttles 421A, 422A, 423A to produce uniform opening and closing of throttles within the first subset. Likewise, a second actuator 445B and its associated linkage 446B (including spring biasing 447B) are configured to control operation of throttles 421B, 422B, 423B to produce uniform opening and closing of throttles within the second subset.

Because each cylinder's throttle mechanism (comprising throttle pairs 421A/421B, 422A/422B, and 423A/423B) is affixed in close proximity to its associated intake valve system (comprising intake valve pairs 441A/441B, 442A/442B, and 443A/443B, respectively), the opening of a throttle by its connected throttle control system actuator and linkage leads to rapid filling of that throttle's cylinder with dense combustion charges. This hyper-filling of the combustion cylinders likewise generates more substantial and energetic exhaust gas to drive turbo system 480, which can include a single turbocharger having a turbine inlet affixed in close proximity to a single exhaust valve 461, 462, 463.

In operation, engine system 400D may operate in idle mode with all throttle plates 421A, 421B, 422A, 422B, 423A, 423B closed. Combustion air for smooth idle mode operation is fed by valve 429 through the passages of equalizing ports 424 that interconnect the air intake channels of the cylinders (e.g., interconnecting the intake ports or interconnecting the intake runners) at a point downstream of the throttle plates and upstream of the intake valves. Effectively, equalizing ports 424 interconnect the intake ports of the cylinders (and, as noted in connection with FIGS. 2A, 2B and 3, equalizing ports 424 may or may not be integral to cylinder head 402). When idle mode operation ceases, valves 426 close, thus sealing the air intake channels of the cylinders 451, 452, 453. In other implementations in which valves 426 are not used, the passages of equalizing ports 424 may be sufficiently small in diameter that air flow between cylinders' intake channels is generally inconsequential once acceleration begins.

In some implementations equalizing ports 424 only need to interconnect a single intake port for each cylinder. In FIGS. 4C and 4D, for example, equalizing ports 424 can also be configured to interconnect intake ports 431A, 432A and 433A to provide adequate, generally even distribution of combustion air during idle mode operation. This type of configuration avoids the need to interconnect intake ports of the same cylinder, which can simplify engine system configuration as well as avoiding any combustion air leakage between same-cylinder intake ports during simultaneous throttle operation (e.g., FIG. 4C) and during staged throttle operation (e.g., FIG. 4D). This interconnection of only one intake port per cylinder would mean that not all of the equalizing ports illustrated in the Figures would be necessary. For example, in FIG. 3, equalizing ports 325 and valve 327 could be eliminated, leaving intake port 331A connected to only one other intake port for each cylinder in combustion assembly 300.

In some implementations when accelerator pedal 406 is depressed, actuator 445A switches to open and, through linkage 446A, throttles 421A, 422A, 423A are opened. Actuator 445B remains in its closed position, keeping throttles 421B, 422B, 423B closed (via linkage 446B and, in some implementations, spring-biasing from springs 447B that accommodate variations in throttles' closed positions to reduce or eliminate leakage when closed). Opening only one intake channel for each cylinder provides advantages over operational modes in which all throttles for all intake channels are opened in unison. For example, with regard to cylinder 451, when actuator 445A and linkage 446A open throttle 421A (and throttle 421B remains closed), which has a throttle plate affixed in close proximity to intake valve 441A, the velocity of combustion air flowing through intake port 431A and intake valve 441A is substantially higher than it would be if both throttles 421A, 421B opened together. The cross-sectional area of only one intake port 431A thus leads to faster combustion air flow and faster filling of cylinder 451. Similar rapid filling occurs with regard to throttle 422A and cylinder 452 and with regard to throttle 423A and cylinder 453. Any minor leakage of combustion air through port 424 connecting intake runner 411A and intake runner 411B has little or no effect on the hyper-filling of cylinder 451 through intake runner 411A and intake port 431A. This staged combustion air flow using a two-actuator-based control system per cylinder delivers more combustion air to the cylinder in a denser charge and thus yields higher power at low RPM.

As the engine system 400D reaches higher speeds, actuator 445B and linkage 446B can then open the remaining throttles 421B, 422B, 423B to provide greater combustion air flow to the cylinders. In some implementations the "A" throttle plates remain open and the cylinders running until maximum torque is achieved for single-port operation of system 400D. That is, the cylinders are run with only one port open until single-port torque is maximized. When this torque peak is reached, the "B" throttle plates can then be opened to provide dual-port air flow to each cylinder. A cylinder's throttle mechanism in FIG. 4D can be considered in close proximity to the cylinder's intake valve system when the total throttle volume between the throttle mechanism and intake valve system is at or below a given threshold in some implementations (e.g., 80% or 60%). Because the throttle-to-intake volume in such implementations is defined as the sum of both intake channels' volumes between a closed throttle plate and a closed intake valve, spacing of the "A" port throttle plate from the "A" port intake valve does not have to identical to the spacing of the "B" port throttle plate from the "B" port intake valve, so some adjustability is available for positioning each throttle plate relative to its respective intake valve.

Again, because the turbochargers do not require small nozzles or the like for low-end performance improvement, operation of engine system 400D at higher speeds is more robust than with earlier turbocharger systems that are "overly tuned" to low-end or low-speed performance compensation. Features such as large A/R ratios can be implemented to further improve turbocharger operation in these types of systems.

In various implementations disclosed herein, reference has been made to low-inertia turbochargers and the like. Such implementations allow use of low rotational inertia turbochargers that have smaller-diameter turbine wheels and compressor wheels than have been used in traditional turbocharging systems (e.g., turbochargers in which the turbine wheel measures less than 3 inches, less than 2.6 inches, or less than 2.1 inches; also turbochargers in which the turbine wheel has a diameter less than the combustion cylinders' bore diameter). The reduced size of such turbocharger components dramatically reduces the rotational inertia of a turbocharger to yield greatly improved tip in performance. The relative rotational inertia of turbocharger components can be different for various types and sizes of engines. In some implementations the dimensions of each turbocharger's turbine wheel includes a diameter that is less than the bore diameter of the engine's combustion cylinders. This sizing limitation on a turbocharger's turbine wheel in some implementations takes into account different engine sizes while still reducing the turbocharger rotational inertia relative to traditional turbo systems for internal combustion engines. Combinations of these features permit high performance operation at high RPM and/or load levels. They also provide simple, reliable and economical configurations that yield greatly improved tip in and operation at low RPM and/or light load levels as well as improving fuel economy and exhaust emissions.

In some non-limiting examples, the impact of smaller turbocharger components on spool up can be seen. In a multiple-cylinder turbocharger of earlier systems (that is, where a single turbocharger receives exhaust gas from two or more combustion cylinders), if the turbine of such a multiple-cylinder turbocharger has a diameter of 3.25 inches and a rotating mass of 1.1 pounds, the turbine's moment of inertia is $(0.5)(m*r^2)$ or 1.452 lb-in$^2$. In implementations of synergistic induction and turbocharging using low-inertia turbochargers, if the turbine of each one-cylinder turbocharger has a diameter of 2.50 inches and a rotating mass of 0.58 pounds, each turbine's moment of inertia is $(0.5)(m*r^2)$ or 0.453 lb-in$^2$. In this illustrative example the one-cylinder turbocharger's turbines have a moment of inertia that is less than one third that of the multiple-cylinder turbocharger's turbine. Implementations of synergistic induction and turbocharging in an internal combustion engine can include turbochargers having turbine diameters of less than 3 inches and, in some implementations, less than 2.6 inches and, in yet other implementations, less than 2 inches, thus greatly reducing the rotational inertia of such turbochargers (which includes their compressor wheels and other structure as well) as compared to larger turbochargers used in earlier multi-cylinder internal combustion engine systems. In some implementations the turbine wheel diameter is limited to being less than the bore diameter of the engine's combustion cylinders. Dimensions for compressor wheels are comparable in many cases to those for turbine wheels, though compressor wheel materials typically differ from turbine wheel materials. Therefore, implementations of synergistic induction and turbocharging in internal combustion engine systems can include compressor wheels having diameters of less than 3 inches and, in some implementations, less than 2.6 inches and, in yet other implementations, less than 2 inches, thus further reducing the rotational inertia of such turbochargers.

Many engines experience high velocity "ram charging" benefits at mid-range and high power operating conditions, which are significantly above initial launch acceleration conditions. "Ram charging" occurs when the incoming combustion air continues filling a cylinder even if the piston is moving past bottom dead center due to the inertia of the incoming combustion air and its compressibility. Air is drawn into a combustion cylinder chamber by piston movement from top dead center to bottom dead center. The intake valve remains open after bottom dead center for 50 to 90 crank angle degrees. At low RPM and low filling velocity, air flow is reversed in direction and pushed back through the intake valve and out of the cylinder when the piston rises after hitting bottom dead center. However, when filling velocity and air mass inertia increase sufficiently, charge filling (i.e., combustion air intake) will continue to increase after bottom dead center where reverse air flow is overcome by the air flow's filling velocity and induction runner mass air inertia.

When an engine is equipped with two intake valves per cylinder with separate, independent intake ports for each intake valve and separate, independent intake runners, each of which supports one of the intake valves, the benefits of "ram charging" can be achieved at low engine RPMs under acceleration conditions if one intake runner is initially closed by a throttle plate, and remains closed until mid-range RPM and torque is achieved. As noted in connection with FIG. 4D separate operation of throttle 421A and throttle 421B provides for opening of only throttle 421A at tip-in so that high velocity combustion air can be supplied to cylinder 451 via intake valve 441A. Because of this higher velocity using only one intake port, ram charging of combustion air in cylinder 451 can be achieved at low RPM and torque levels, a characteristic not available with earlier induction systems.

Figure 5:
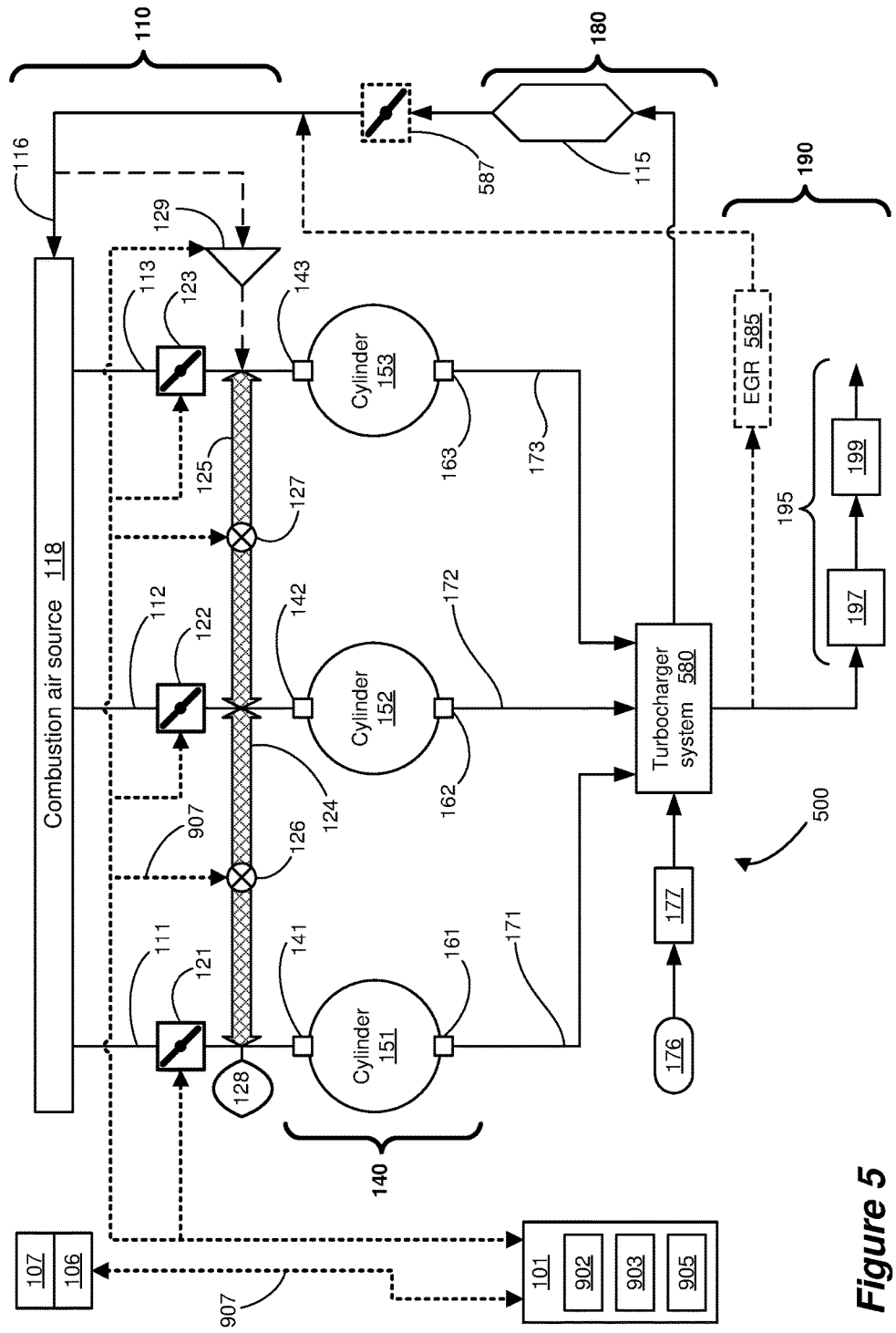
FIG. 5 illustrates an internal combustion engine system.

FIG. 5 illustrates synergistic induction and turbocharging in an internal combustion engine system 500 similar to system 100 FIG. 1. However, system 500 uses a generic turbocharging system 580 that may comprise one or more turbochargers and related components, features and characteristics. Some implementations of synergistic induction and turbocharging can utilize one low-inertia turbocharger for each cylinder, where the turbocharger's turbine inlet is affixed in close proximity to the cylinder's exhaust valve (e.g., where the exhaust-to-turbine volume is less than 80% of the cylinder displacement or, in some implementations, where the exhaust-to-turbine volume is less than 60% of the cylinder displacement). Some implementations of synergistic induction and turbocharging can use an earlier type of turbocharger system in which a single turbocharger receives exhaust gas from multiple cylinders through runners or the like. These turbocharging systems do not have the same response benefits of a one-turbocharger-per-cylinder system, but nevertheless can be part of synergistic induction and turbocharging in internal combustion engine systems. Additionally, system 500 shows an optional exhaust gas recirculation (EGR) system 585 that can be controlled in part by an EGR throttle 587 that can control the flow of recirculated exhaust gas into the combustion air supply.

Figure 6A:
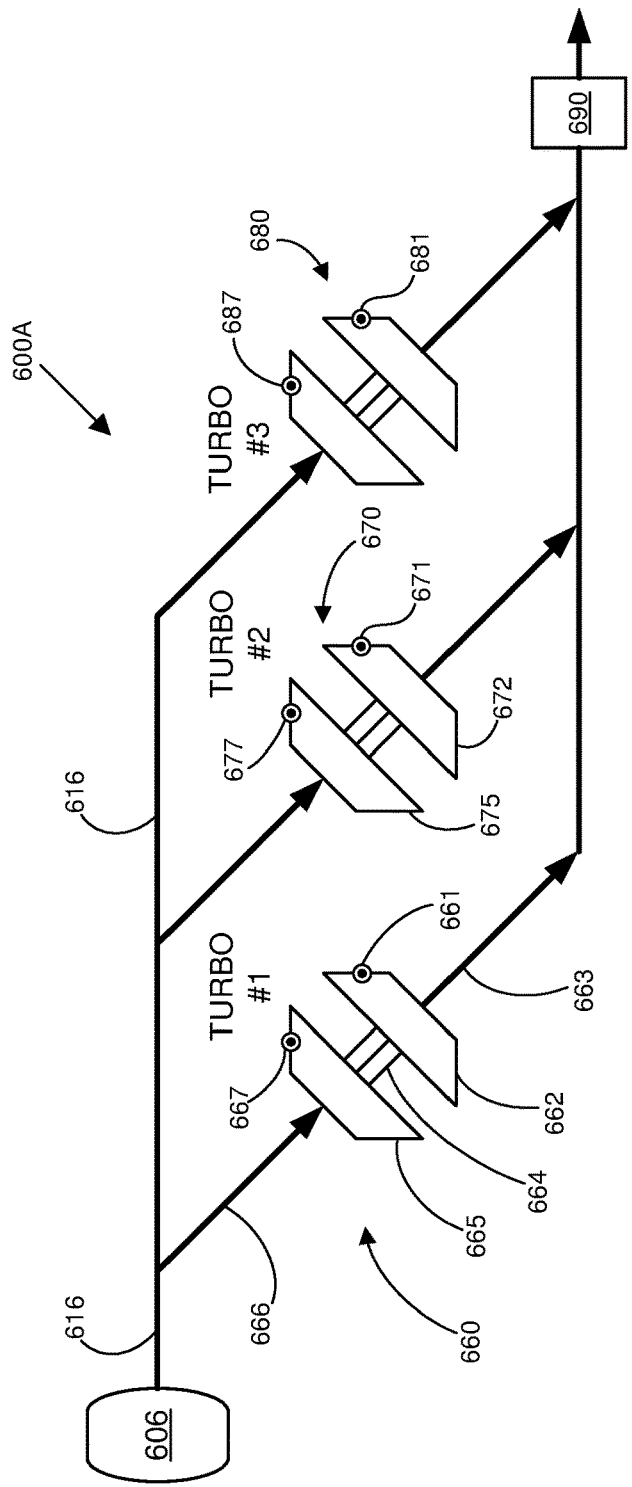
FIG. 6A illustrates an internal combustion engine system.

Mounting a turbocharger in close proximity to the cylinder exhaust valve(s) may present packaging challenges, depending on the size and configuration of the turbochargers utilized, especially with regard to lateral interference. FIG. 6A illustrates one implementation of synergistic induction and turbocharging in an internal combustion engine system 600A in which the individual turbochargers are nested to permit mounting of each turbocharger in close proximity to the exhaust valve of its corresponding cylinder, as well as simplifying the plumbing and routing of fresh air and exhaust gas. Turbochargers are mounted to the engine cylinder head or the like using an angular orientation that facilitates routing of fresh air and exhaust gas, as well as spacing of turbochargers relative to one another. This nesting of turbochargers in some implementations provides improved or optimal mounting of the turbochargers so that they are affixed in close proximity to the exhaust valves of their respective cylinders. In some implementations, an angular orientation of 15° to 75° can be used (the "angular orientation" of each turbocharger being measured between the line connecting the centers of the cylinder head exhaust ports and the turbocharger shaft axis, in a plane parallel with the cylinder head exhaust face), though each engine's cylinder arrangement, cylinder block configuration and cylinder head configuration may affect the ways in which turbochargers can be affixed in close proximity to the cylinders' exhaust valve(s).

Figure 6B:
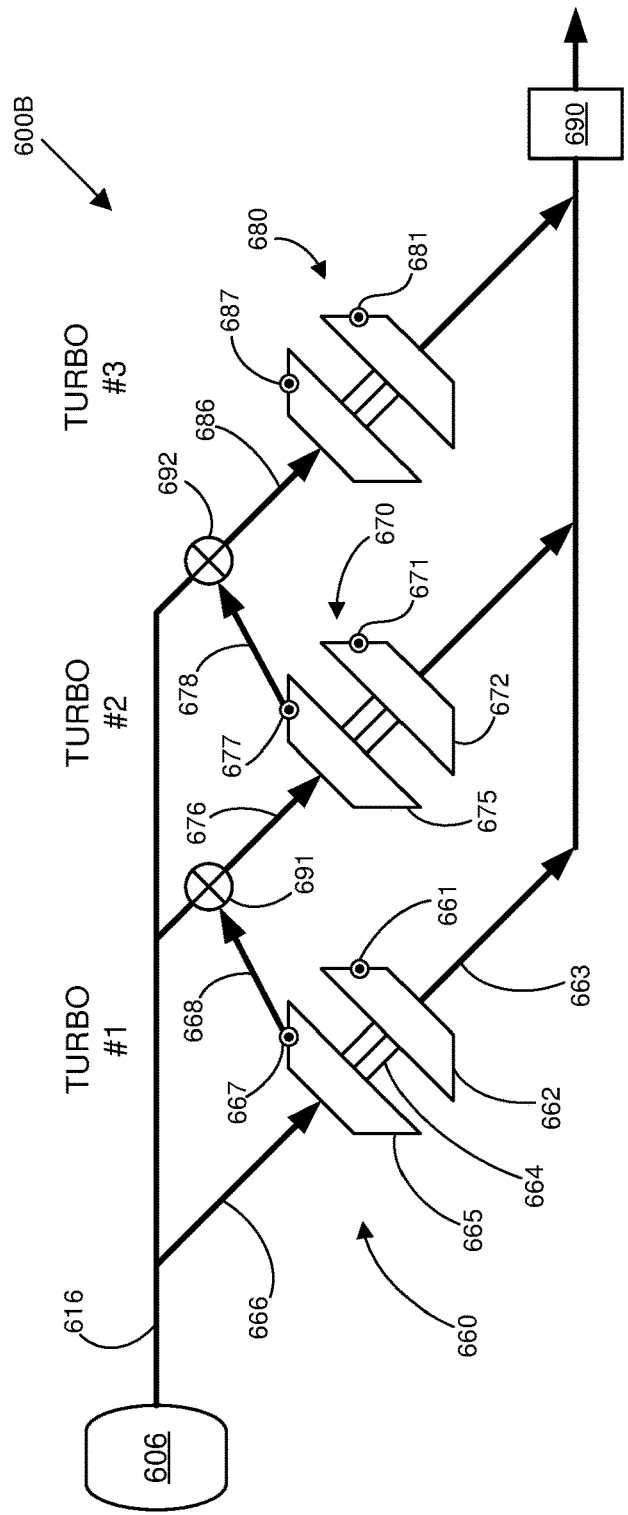
FIG. 6B illustrates an internal combustion engine system.

FIGS. 6A and 6B show an exemplary nesting implementation using an angular orientation (as defined above) of approximately 45° for each turbocharger (it is possible that all turbochargers in an implementation might not have the same angular orientation), which provides space for plumbing of compressed air and exhaust gas, as well as adequate space for the turbines and compressor wheels of the turbochargers 660, 670, 680. Angular orientations that provide suitable access to inlets and outlets, as well as unobstructed operation of the turbochargers' turbines and compressor wheels may be used in some implementations.

System 600A shows an air cleaner 606 or other source of fresh air provided to fresh air line 616. Three turbochargers 660, 670, 680 are connected to line 616. Exemplary turbocharger 660 has an exhaust gas inlet 661 affixed in close proximity to a first cylinder exhaust valve (e.g., by mounting the turbocharger 660 directly to the cylinder head that partially defines and houses the first cylinder). As noted herein, a turbocharger turbine inlet affixed in close proximity to its associated exhaust valve may be operationally mounted or otherwise situated so that an exhaust-to-turbine volume is less than or equal to 80% of the cylinder displacement, where the exhaust-to-turbine volume is defined as the volume between a closed exhaust valve and the turbocharger's turbine inlet. In some implementations a turbocharger turbine inlet affixed in close proximity to its associated exhaust valve may be operationally mounted or otherwise situated so that an exhaust-to-turbine volume is less than or equal to 60% of the cylinder displacement. In some implementations a turbocharger turbine inlet affixed in close proximity to its associated exhaust valve may be operationally mounted or otherwise situated so that exhaust gas discharged from a cylinder still possesses its pulse characteristics as it enters the turbocharger turbine inlet. In some implementations a turbocharger turbine inlet affixed in close proximity to its associated exhaust valve may be operationally mounted or otherwise situated so that the linear distance the exhaust gas travels from exhaust valve to the turbocharger turbine inlet is less than or equal to 10 inches, 8 inches, 6 inches, 4 inches or 2 inches.

Exhaust gas turbine inlet 661 is depicted in FIG. 6A as accepting exhaust gas traveling in a direction perpendicularly out of the plane of the drawing in FIG. 6A. Exhaust gas discharged from the first cylinder's exhaust valve(s) spin turbine 662 and thus shaft 664 and compressor wheel 665. After engaging the turbine 662, the exhaust gas is discharged from turbocharger 660 via turbine outlet 663 and thence to the engine's exhaust system 690. Fresh air supplied via line 616 to compressor inlet 666 is pressurized by compressor wheel 665 and the pressurized fresh air exits turbocharger 660 through compressor outlet 667. In FIG. 6A the compressed fresh air from each turbocharger 660, 670, 680 can be supplied directly to a combustion air source (not shown), such as an intake manifold. Again, as with the turbine inlet 661, compressor outlet 667 is depicted in FIG. 6A as discharging pressurized fresh air traveling in a direction perpendicularly out of the plane of the drawing in FIG. 6A.

Similarly, turbocharger 670 has a turbine inlet 671 for turbine 672 that accepts exhaust gas from a second cylinder and drives compressor wheel 675 to pressurize fresh air that is then discharged from compressor outlet 677. Also, a third turbocharger 680 accepts exhaust gas from a third cylinder via turbine inlet 681 and provides pressurized fresh air through compressor outlet 687. As noted in connection with some implementations, exhaust gas from the various cylinders can be made available to multiple turbochargers via balancing passages and balancing valves or the like (not shown). In FIG. 6A the pressurized fresh air can be supplied directly to the combustion air source or can be configured in various ways. One such implementation for configuring pressurized fresh air from the turbochargers' compressors is illustrated in FIG. 6B.

System 600B of FIG. 6B illustrates optional configuring of compressor fresh air supplying and pressurized fresh air outputs of turbochargers 660, 670, 680. The components of system 600B of FIG. 6B operate analogously to those of system 600A in FIG. 6A. However, the compressor outlet 667 of turbocharger 660 has a pressurized fresh air supply line 668 connected to valve 691, which provides the option of supplying pressurized fresh air output by turbocharger 660 to the compressor inlet 676 of turbocharger 670. Likewise, compressor outlet 677 of turbocharger 670 can supply its pressurized fresh air via line 678 through valve 692 to the compressor inlet 686 of turbocharger 680. As opposed to "in parallel" compressed air routing (e.g., as shown in FIG. 1), pressurized fresh air from compressor outlet 687 in system 600B can then be supplied at a higher pressure to an intake manifold or the like using an "in series" compressed air routing configuration.

Figure 7:
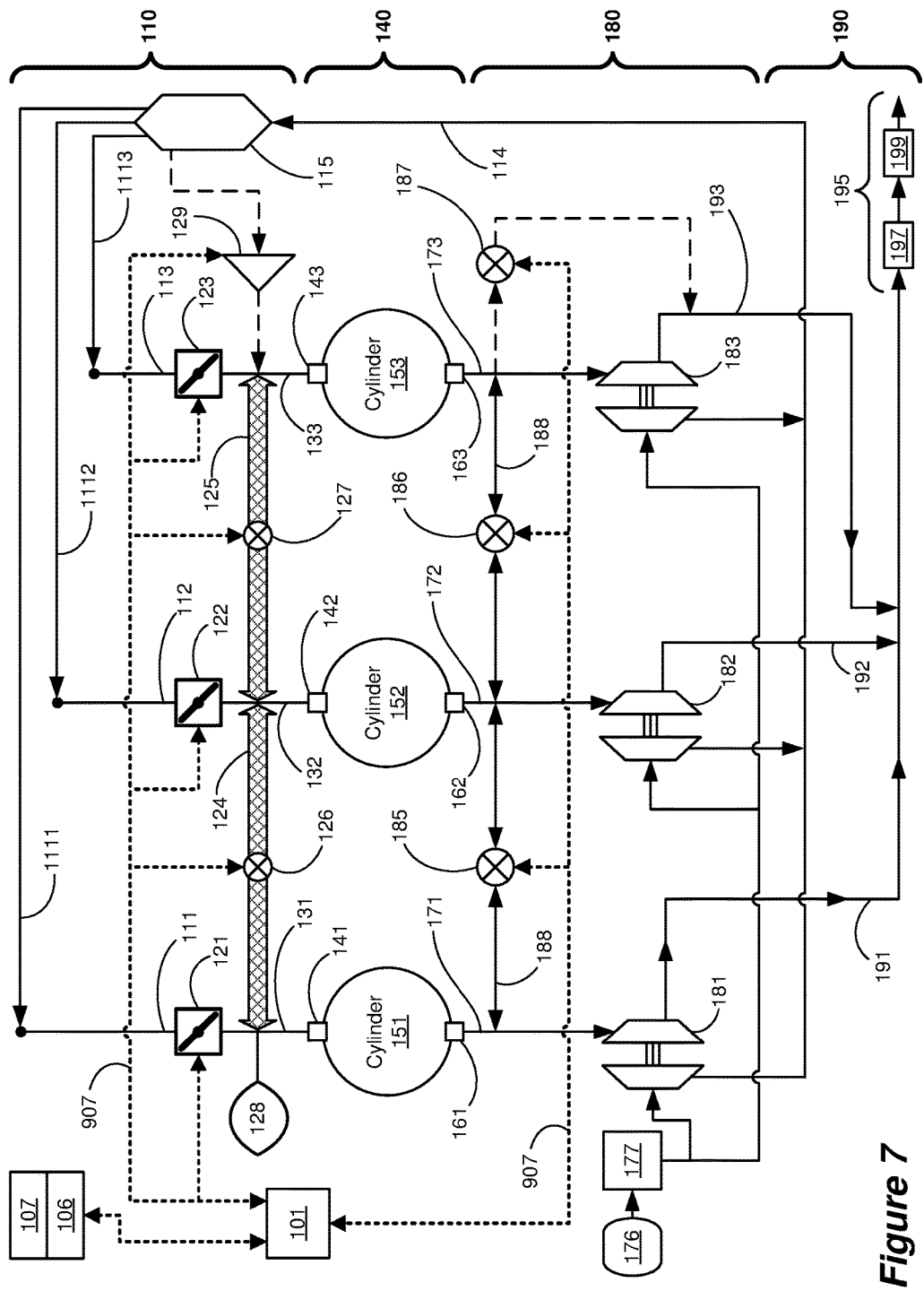

In some implementations of synergistic induction and turbocharging, for example as shown in FIG. 7, individual combustion air lines 1111, 1112, 1113 can be used to supply combustion air directly to intake runners 111, 112, 113. While these lines are shown in FIG. 7 as different lengths (these combustion air supply lines are being depicted schematically), in some implementations the length of each combustion air pathway (e.g., runners or other connecting plumbing) from intercooler 115 to each throttle 121, 122, 123 is approximately equal to provide even pressurization prior to opening of the throttle plates.

Figure 8:
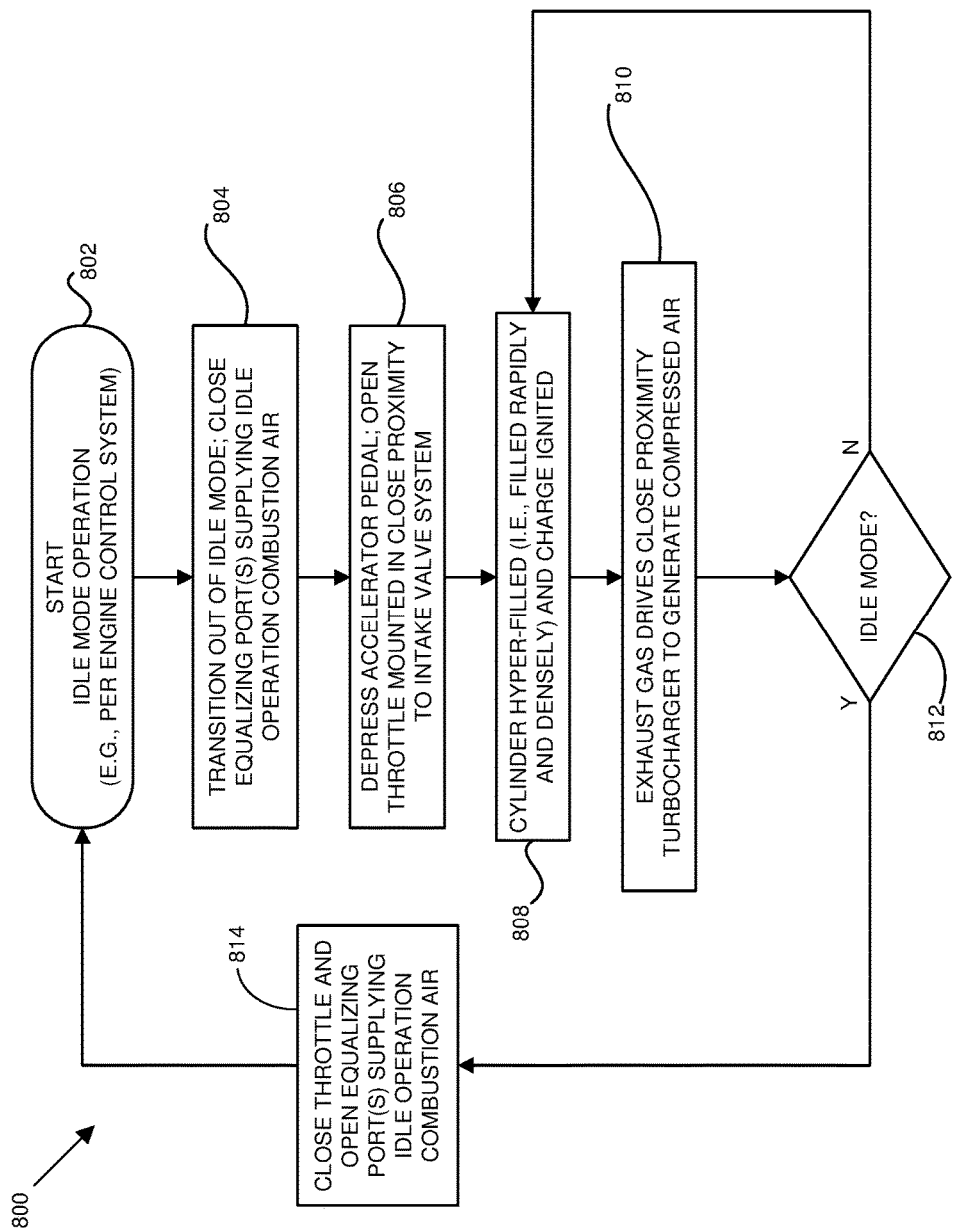
FIG. 8 illustrates a method of operation of an internal combustion engine system.

FIG. 8 illustrates one or more methods for operating an internal combustion engine system implementing one or more modes of synergistic induction and turbocharging. The engine system of FIG. 8 has a plurality of combustion cylinder assemblies, each of which comprises a combustion cylinder having one or more exhaust valves that discharge exhaust gas to an exhaust port and having an intake valve system comprising one or more intake valves. Combustion air is supplied to each combustion cylinder from a combustion air source via a single intake port that delivers the combustion air to the cylinder through the one or more intake valves (e.g., as in Intake Configurations 1 and 2, above). Each combustion assembly also comprises a throttle that is affixed in close proximity to intake valve system (i.e., the one or more intake valves) and that controls combustion air flow from the combustion air source through the single intake port to the one or more intake valves. The various combustion assemblies' intake ports are interconnected by one or more valved equalizing ports that control combustion air flow between the intake ports, including supplying idle mode combustion air to the combustion cylinder assemblies when the engine operates in idle mode.

FIG. 8 illustrates operating one of the plurality of the combustion assemblies, the illustrated process 800 being repeated by each combustion assembly in the engine system in a normal sequencing of combustion cylinder ignition. Process (800) begins with the engine system operating in idle mode (802), for example when an engine control system (e.g., an ECU) determines that the engine is operating in idle mode. The engine transitions out of idle mode (804) and any equalizing port(s) supplying combustion air to the combustion assembly during idle mode operation are closed. The accelerator pedal is then engaged (806) and the combustion assembly throttle (which is affixed in close proximity to the intake valve system comprising one or more intake valves) is opened. The cylinder rapidly fills with combustion air and the charge is ignited (808). Exhaust gas from the ignition is discharged through an exhaust port and drives a turbocharger having a turbine inlet affixed in close proximity to the cylinder exhaust port (810). If idle mode is not detected (812), the compressed air from the driven turbocharger is supplied to the combustion air source and is used for subsequent filling of the cylinder (808). If idle mode operation of the engine is detected (812), then the throttle is closed and any equalizing port(s) opened to supply combustion air to the combustion assembly cylinder during idle operation (802).

Figure 9:
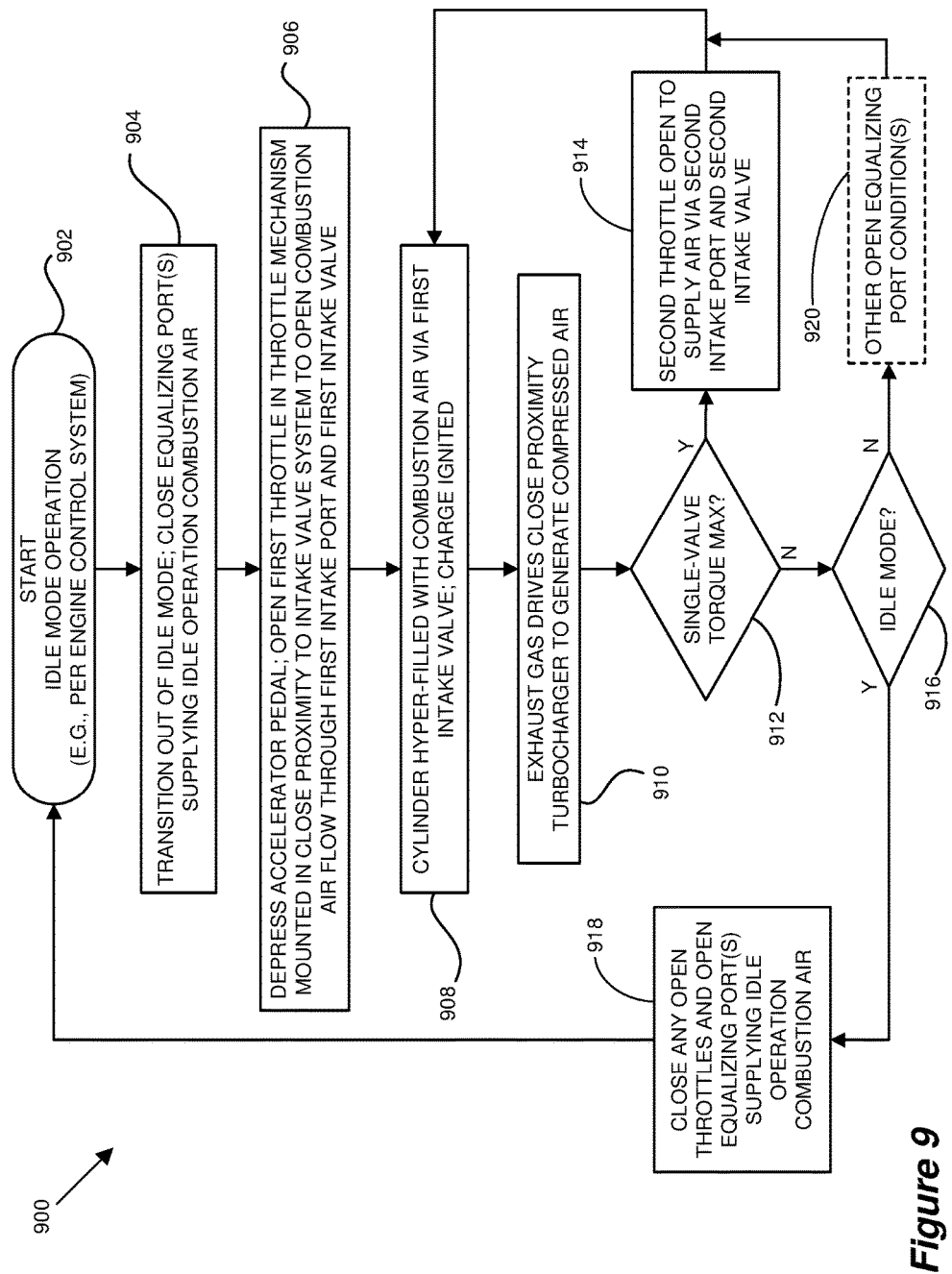
FIG. 9 illustrates a method of operation of an internal combustion engine system.

FIG. 9 illustrates one or more methods for operating an internal combustion engine system implementing one or more modes of synergistic induction and turbocharging. The engine system of FIG. 9 has a plurality of combustion assemblies, each of which comprises a combustion cylinder having an exhaust valve that discharges exhaust gas to an exhaust port. Each combustion cylinder also has two intake valves—a first intake valve connected to a combustion air source via a first intake port, and a second intake valve connected to a combustion air source via a second intake port that is separate from and independent of the first intake port. A first throttle is affixed in close proximity to the first intake valve and controls combustion air flow from the combustion air source to the cylinder via the first intake port and first intake valve. A second throttle controls combustion air flow from the combustion air source to the cylinder via the second intake port and second intake valve. The various combustion assemblies' first intake ports are interconnected by one or more valved equalizing ports that control combustion air flow between the first intake ports.

FIG. 9 illustrates operating one of the plurality of the combustion assemblies, the illustrated process 900 being repeated by each combustion assembly in the engine system in a normal sequencing of combustion cylinder ignition. Process (900) begins with the engine system operating in idle mode (902), for example when a vehicle engine control system determines the engine is operating in idle mode. The engine transitions out of idle mode (904) and any equalizing port(s) supplying combustion air to the combustion assembly during idle operation are closed. The accelerator pedal is then engaged (906) and the combustion assembly's first throttle (which is part of the throttle mechanism that is affixed in close proximity to the intake valve system) is opened. The cylinder hyper-fills, rapidly filling with combustion air delivered via the first intake port and first intake valve, and the charge is ignited (908). Exhaust gas from the ignition is discharged through the exhaust port and drives a turbocharger having a turbine inlet affixed in close proximity to the cylinder's one or more exhaust valves (910). If a threshold (912) is reached (e.g., a maximum torque level for single-intake-valve operation), then the second throttle is opened (if it is closed) and combustion air flows from the combustion air source to the cylinder via the second intake port and second intake valve (914). If the threshold (912) is not reached, and idle mode operation does not begin (916), then compressed air from the driven turbocharger is supplied to the combustion air source and is used for subsequent filling of the cylinder (908). If the threshold is not reached, and idle mode operation commences (916), then any open throttles are closed (918) and any equalizing port(s) opened to supply combustion air to the combustion assembly cylinder during idle operation (902). As noted by step (920), there may be other operating conditions in which one or more equalizing ports are partially or completely opened.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:
1. An internal combustion engine system comprising:
 a first cylinder assembly comprising:
  a first cylinder having a first cylinder displacement;
  a first intake valve system comprising a first intake valve controlling admission of combustion air to the first cylinder from a first intake port;
  a first exhaust valve system comprising a first exhaust valve controlling discharge of exhaust gas from the first cylinder to a first exhaust port;
  a first induction system comprising a first throttle mechanism affixed in close proximity to the first intake valve system, the first throttle mechanism comprising a first throttle plate operationally affixed to control combustion air flow into the first cylinder through the first intake port, wherein the first throttle plate and the first intake valve define a first throttle-to-intake volume in the first intake port, wherein the first throttle-to-intake volume is less than or equal to 80% of the first cylinder displacement; and
  a first turbocharger comprising a first turbine inlet affixed in close proximity to the first exhaust valve;
 a second cylinder assembly comprising:
  a second cylinder having a second cylinder displacement;

a second intake valve system comprising a second intake valve controlling admission of combustion air to the second cylinder from a second intake port;

a second exhaust valve system comprising a second exhaust valve controlling discharge of exhaust gas from the second cylinder to a second exhaust port;

a second induction system comprising a second throttle mechanism affixed in close proximity to the second intake valve system, the second throttle mechanism comprising a second throttle plate operationally affixed to control combustion air flow into the second cylinder through the second intake port, wherein the second throttle plate and the second intake valve define a second throttle-to-intake volume in the second intake port, wherein the second throttle-to-intake volume is less than or equal to 80% of the second cylinder displacement; and a second turbocharger comprising a second turbine inlet affixed in close proximity to the second exhaust valve; and an idle air flow equalizing system comprising a first equalizing passage connecting the first intake port downstream of the first throttle plate to the second intake port downstream of the second throttle plate; and an exhaust gas balancing port system comprising a first balancing passage connecting the first exhaust port upstream of the first turbocharger turbine inlet to the second exhaust port upstream of the second turbocharger turbine inlet.

2. The engine system of claim 1 further comprising a throttle control system comprising:

a mechanical linkage operationally connected to the first and second throttle plates; and a linkage actuator connected to the mechanical linkage and configured to move the mechanical linkage between an open throttle position and a closed throttle position.

3. The engine system of claim 2 wherein the mechanical linkage comprises a spring-biasing mounting of the second throttle plate.

4. The engine system of claim 1 wherein the idle air flow equalizing system further comprises a first equalizing port valve within the first equalizing passage;

further wherein the exhaust gas system comprises a first balancing port valve within the first balancing passage.

5. The engine system of claim 1 wherein the first turbocharger is a low-inertia turbocharger and further wherein the second turbocharger is a low-inertia turbocharger.

6. The engine system of claim 5 wherein the first cylinder has a first bore diameter and further wherein first turbocharger comprises a first turbine wheel having a diameter less than the first bore diameter; and further wherein the second cylinder has a second bore diameter and further wherein second turbocharger comprises a second turbine wheel having a diameter less than the second bore diameter.

7. The engine system of claim 1 wherein the idle air flow equalizing system further comprises an idle mode air source connected to the first equalizing passage.

8. The engine system of claim 1 further comprising a third cylinder assembly comprising:

a third cylinder having a third cylinder displacement;

a third intake valve system comprising a third intake valve controlling admission of combustion air to the third cylinder from a third intake port;

a third exhaust valve system comprising a third exhaust valve controlling discharge of exhaust gas from the third cylinder to a third exhaust port;

a third induction system comprising a third throttle mechanism affixed in close proximity to the third intake valve system, the third throttle mechanism comprising a third throttle plate operationally affixed to control combustion air flow into the third cylinder through the third intake port, wherein the third throttle plate and the third intake valve define a third throttle-to-intake volume in the third intake port, wherein the third throttle-to-intake volume is less than or equal to 80% of the third cylinder displacement; and a third turbocharger comprising a third turbine inlet affixed in close proximity to the third exhaust valve;

wherein the idle air flow equalizing system further comprises a second equalizing passage connecting the second intake port downstream of the second throttle plate to the third intake port downstream of the third throttle plate; and further wherein the exhaust gas balancing port system comprises a second balancing passage connecting the second exhaust port upstream of the second turbocharger turbine inlet to the third exhaust port upstream of the third turbocharger turbine inlet.

9. The engine system of claim 1 wherein a first exhaust-to-turbine volume in a first exhaust channel between the first exhaust valve and the first turbine inlet is less than 80% of the first cylinder displacement; and further wherein a second exhaust-to-turbine volume in a second exhaust channel between the second exhaust valve and the second turbine inlet is less than 80% of the second cylinder displacement.

10. An internal combustion engine system comprising a plurality of combustion cylinder assemblies, wherein each combustion cylinder assembly comprises:

a cylinder having a cylinder displacement;

an intake valve system comprising an intake valve controlling admission of combustion air to the cylinder from an intake port;

an exhaust valve system comprising an exhaust valve controlling discharge of exhaust gas from the cylinder to an exhaust port;

an induction system comprising a throttle mechanism comprising a throttle operationally affixed to control air flow through the intake port, wherein the throttle and the intake valve define a throttle-to-intake volume in an intake channel, wherein the throttle-to-intake volume is less than or equal to 80% of the cylinder displacement; and a turbocharging system for each cylinder, wherein each turbocharging system comprises a turbocharger comprising a turbine inlet, wherein the turbine inlet and the exhaust valve define an exhaust-to-turbine volume in an exhaust channel that is less than or equal to 80% of the cylinder displacement.

11. The engine system of claim 10 wherein the throttle-to-intake volume is less than or equal to 60% of the cylinder displacement.

12. The engine system of claim 10 further comprising an equalizing port connecting a plurality of cylinder intake ports downstream of their respective throttles, wherein the equalizing port defines an idle combustion air flow system that permits generally uniform combustion air flow to the cylinder intake valves during idle mode operation, wherein the equalizing port comprises an equalizing passage.

13. The engine system of claim 12 wherein the equalizing port further comprises an equalizing port valve operationally mounted in the equalizing passage, wherein the equalizing port valve controls idle mode combustion air flow in the equalizing passage to permit air flow through the equalizing passage when the engine system operates in idle mode and prevents air flow through the equalizing passage in all other operating conditions.

14. The engine system of claim 13 further comprising a balancing port system comprising one or more balancing ports, wherein each balancing port connects two cylinder exhaust ports to permit sharing of exhaust gas among turbochargers.

15. The engine system of claim 10 further comprising a throttle control system comprising:
 a mechanical linkage operationally connected to a first throttle set;
 a linkage actuator comprising a motor connected to the mechanical linkage and configured to move the mechanical linkage between an open throttle position and a closed throttle position.

16. The engine system of claim 15 wherein the mechanical linkage comprises at least one spring-biased throttle mounting.

17. An internal combustion engine system comprising a plurality of combustion cylinder assemblies, wherein each combustion cylinder assembly comprises:
 a cylinder having a cylinder displacement;
 an intake valve system comprising an intake valve controlling admission of combustion air to the cylinder from an intake port;
 an exhaust valve system comprising an exhaust valve controlling discharge of exhaust gas from the cylinder to an exhaust port; and
 an induction system comprising a throttle mechanism comprising a throttle plate operationally affixed to control combustion air flow into the cylinder through the intake port and the intake valve, wherein the throttle plate is operationally affixed in an intake channel to define a throttle-to-intake volume between the throttle plate and the intake valve, further wherein the throttle-to-intake volume is less than or equal to 80% of the cylinder displacement;
 at least one equalizing port connecting different intake ports at points downstream of their respective throttles, wherein the at least one equalizing port permits generally even combustion air flow to the cylinders when the engine system operates in idle mode; and
 a turbocharging system comprising:
  a turbocharger comprising a turbine inlet affixed in close proximity to the exhaust valve, wherein an exhaust-to-turbine volume defined in an exhaust channel between the exhaust valve and the turbine inlet is less than 80% of the cylinder displacement; and
  at least one balancing port connecting the exhaust valve of one of the plurality of combustion cylinder assemblies to the exhaust valve of a different one of the plurality of combustion cylinder assemblies.

18. The engine system of claim 17 wherein each equalizing port comprises an equalizing passage and an equalizing port valve mounted in the equalizing passage, wherein the equalizing port valve controls air flow through the equalizing passage.

19. The engine system of claim 18 wherein each balancing port comprises a balancing valve to control exhaust gas flow between exhaust ports.

20. The engine system of claim 17 further comprising a throttle control system, wherein the throttle control system comprises an actuator connected to each throttle plate to control the throttle plate and a control unit controlling each actuator.

21. The engine system of claim 17 further comprising a throttle control system, wherein the throttle control system comprises:
 a mechanical linkage operationally linking a plurality of throttle plates;
 a linkage actuator connected to the mechanical linkage and configured to move the mechanical linkage between an open linked throttle plate position and a closed linked throttle plate position.

22. The engine system of claim 21 wherein the mechanical linkage comprises at least one spring-biasing mounting of a throttle plate.

* * * * *